(12) United States Patent
Cao et al.

(10) Patent No.: US 10,222,471 B2
(45) Date of Patent: Mar. 5, 2019

(54) VEHICLE MOVEMENT ESTIMATION DEVICE AND VEHICLE MOVEMENT ESTIMATION METHOD

(71) Applicant: Panasonic Intellectual Property Management Co., Ltd., Osaka (JP)

(72) Inventors: Yunyun Cao, Tokyo (JP); Hirofumi Nishimura, Kanagawa (JP); Takaaki Kishigami, Tokyo (JP); Asako Hamada, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 442 days.

(21) Appl. No.: 15/063,270

(22) Filed: Mar. 7, 2016

(65) Prior Publication Data

US 2016/0291143 A1    Oct. 6, 2016

(30) Foreign Application Priority Data

Mar. 31, 2015  (JP) ................. 2015-070862

(51) Int. Cl.
*G01S 13/60* (2006.01)
*G01S 13/87* (2006.01)
*G01S 13/93* (2006.01)

(52) U.S. Cl.
CPC ............ *G01S 13/931* (2013.01); *G01S 13/60* (2013.01); *G01S 13/874* (2013.01); *G01S 2013/9385* (2013.01)

(58) Field of Classification Search
CPC ...... G01S 13/931; G01S 13/60; G01S 13/874; G01S 7/40; G01S 7/4004; G01S 7/4026
See application file for complete search history.

(56) References Cited

U.S. PATENT DOCUMENTS

| | | | |
|---|---|---|---|
| 5,471,214 A * | 11/1995 | Faibish | G01S 13/931 342/54 |
| 6,675,094 B2 * | 1/2004 | Russell | G01S 13/931 701/301 |
| 7,372,395 B2 * | 5/2008 | Kojima | G01S 13/60 342/104 |
| 7,522,091 B2 * | 4/2009 | Cong | B60K 31/0008 342/107 |

(Continued)

FOREIGN PATENT DOCUMENTS

| JP | 2004-508627 | 3/2004 |
|---|---|---|
| JP | 2014-160419 A | 9/2014 |
| WO | 2002/021156 | 3/2002 |

*Primary Examiner* — Peter M Bythrow
(74) *Attorney, Agent, or Firm* — Seed IP Law Group LLP

(57) ABSTRACT

A vehicle movement estimation device has a radar that is provided in a vehicle and that performs transmission of a radar wave and reception of a reflected wave that is the radar wave reflected by an object, a radar movement estimator that estimates a radar movement velocity and a radar movement direction of the radar based on the received reflected wave, an angular velocity estimator that estimates a rotational angular velocity of the vehicle, and a vehicle movement estimator that estimates a movement velocity and a movement direction of a prescribed position of the vehicle based on the estimated radar movement velocity and radar movement direction, the estimated rotational angular velocity, and a spatial relationship between the radar and the prescribed position.

7 Claims, 21 Drawing Sheets

(56) References Cited

U.S. PATENT DOCUMENTS

| | | | | |
|---|---|---|---|---|
| 8,082,101 B2* | 12/2011 | Stein | G08G 1/16 | 701/301 |
| 8,433,510 B2* | 4/2013 | Bradai | B60Q 1/085 | 701/421 |
| 8,704,704 B2* | 4/2014 | Luebbert | G01S 13/343 | 342/104 |
| 9,694,712 B2* | 7/2017 | Healy | B60L 15/2045 | |
| 2003/0135308 A1* | 7/2003 | Richardson | G01S 7/411 | 701/23 |
| 2005/0179580 A1* | 8/2005 | Cong | B60K 31/0008 | 342/70 |
| 2005/0203705 A1* | 9/2005 | Izumi | B60T 7/22 | 701/301 |
| 2005/0267683 A1* | 12/2005 | Fujiwara | B60T 8/17558 | 701/301 |
| 2006/0262007 A1* | 11/2006 | Bonthron | G01S 13/34 | 342/70 |
| 2008/0007446 A1* | 1/2008 | Nakamura | G01S 7/487 | 342/27 |
| 2010/0017128 A1* | 1/2010 | Zeng | B60W 40/105 | 701/301 |
| 2010/0075618 A1* | 3/2010 | Isaji | G01S 13/345 | 455/90.1 |
| 2011/0295549 A1* | 12/2011 | Takabayashi | G01S 7/4004 | 702/142 |
| 2012/0169532 A1* | 7/2012 | Yamada | G01S 13/87 | 342/25 R |
| 2013/0124061 A1* | 5/2013 | Khanafer | G06F 17/00 | 701/70 |
| 2015/0025786 A1* | 1/2015 | Hohm | B60W 40/105 | 701/300 |

* cited by examiner

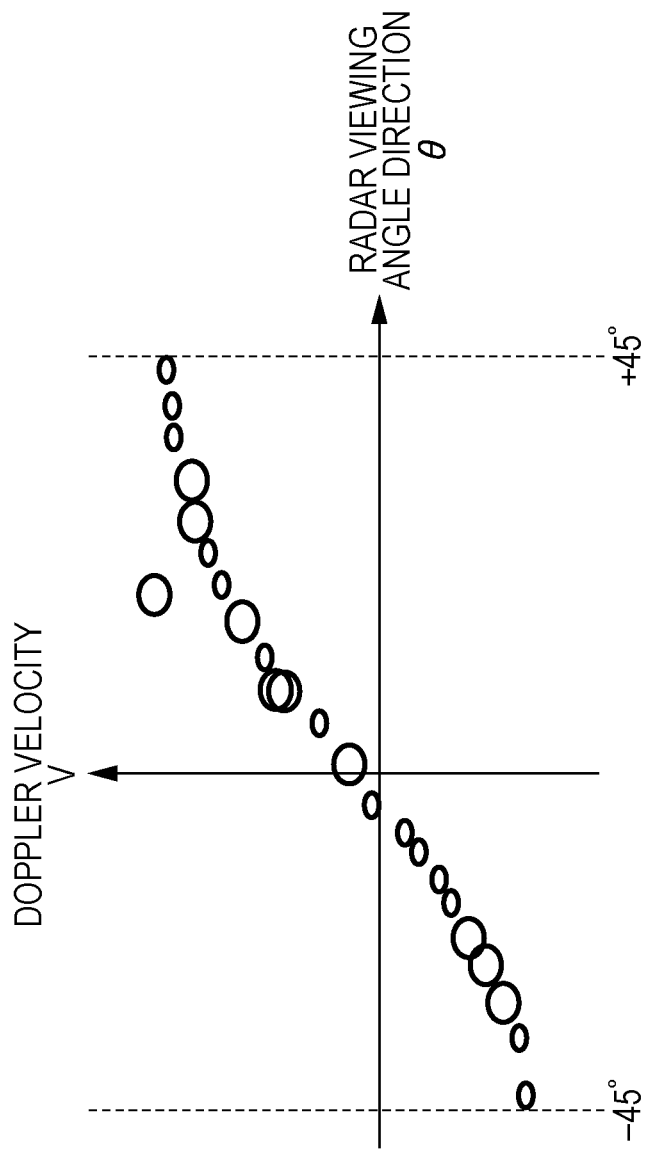

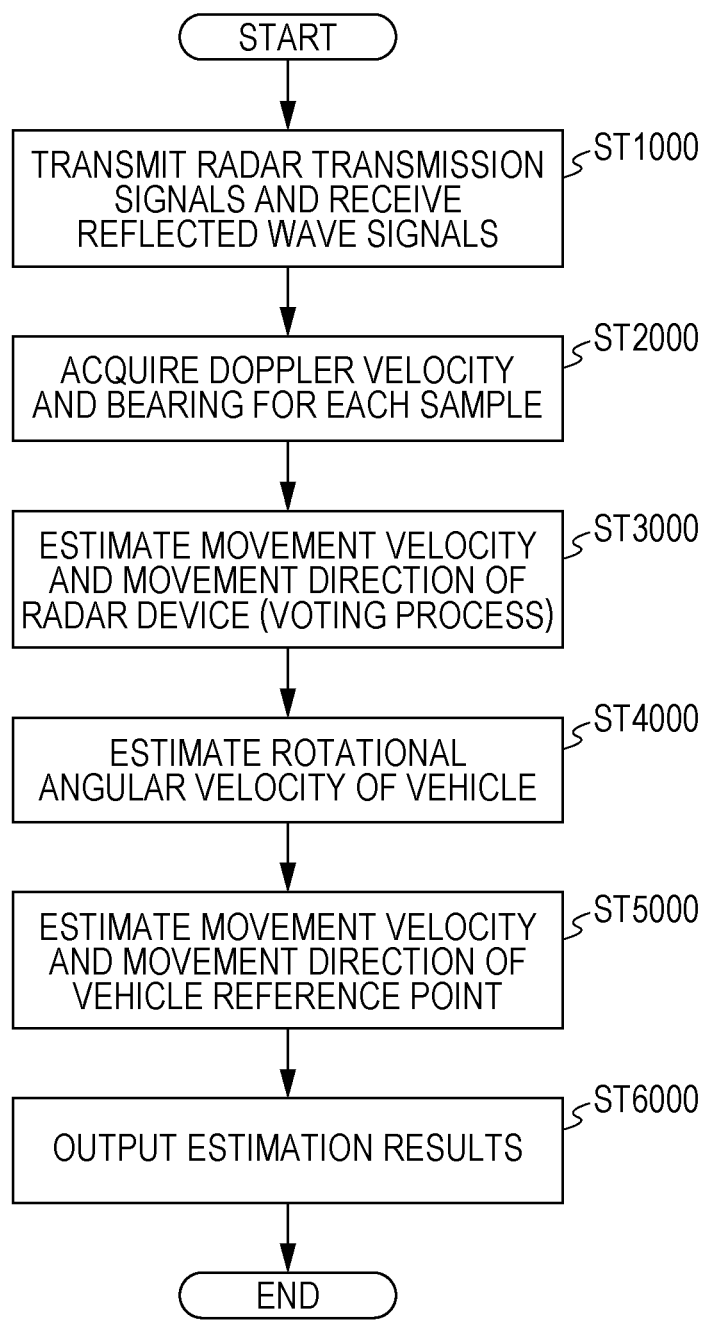

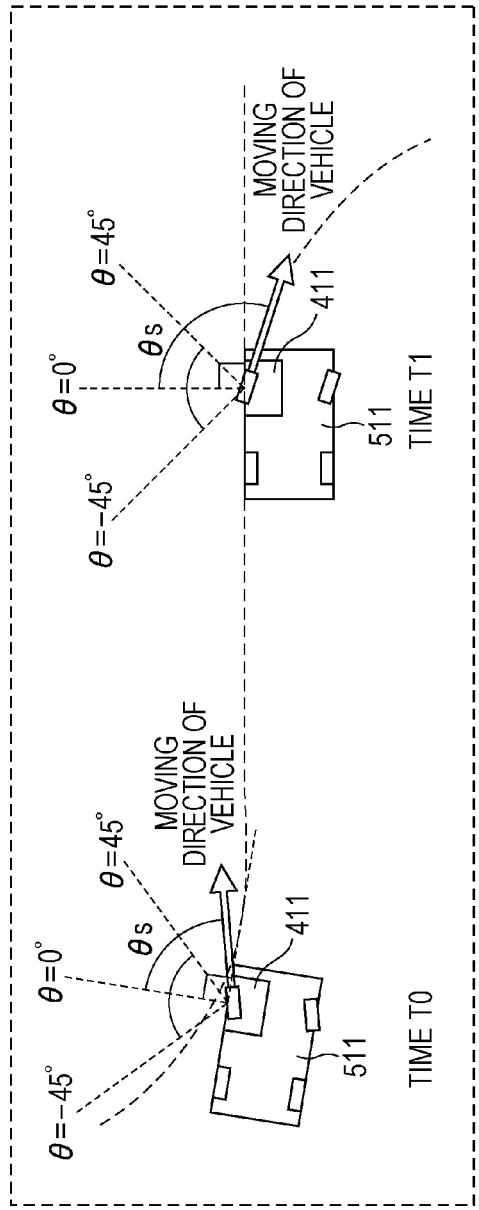
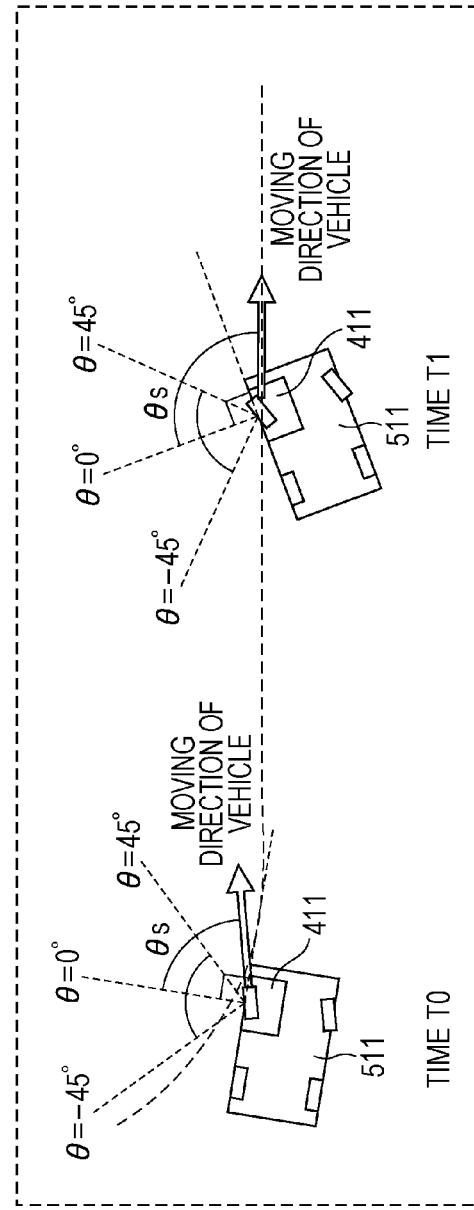
FIG. 14A
FIG. 14B

VEHICLE MOVEMENT ESTIMATION DEVICE AND VEHICLE MOVEMENT ESTIMATION METHOD

BACKGROUND

1. Technical Field

The present disclosure relates to a vehicle movement estimation device and a vehicle movement estimation method that estimate a movement velocity and a movement direction of a vehicle.

2. Description of the Related Art

In view of improvement in traffic safety and so forth, it is desired to estimate a movement velocity and a movement direction of a vehicle with high accuracy.

Accordingly, a technique of estimating a movement velocity and a movement direction of a vehicle has been suggested (see, for example, Japanese Unexamined Patent Application Publication (Translation of PCT Application) No. 2004-508627). In a technique disclosed in Japanese Unexamined Patent Application Publication (Translation of PCT Application) No. 2004-508627 (hereinafter referred to as "related art"), the movement velocity of the vehicle is estimated by acquiring wheel rotation data of the vehicle, and the movement direction of the vehicle is estimated by integrating results of successive measurements of the yaw rate (rotational angular velocity) by a gyroscope mounted on the vehicle.

However, the related art has difficulty in estimating the movement velocity of the vehicle from the rotational velocity of the wheel in a case where the wheel of the vehicle slips. Further, in the gyroscope, a drift error occurs due to the influence of a temperature and so forth, and the accuracy of the measured angular velocity thus degrades with respect to the lapse of time. In addition, the accuracy also degrades in a case where a road surface is inclined or uneven. That is, the related art has difficulty in robustly estimating the movement velocity and movement direction of the vehicle.

SUMMARY

One non-limiting and exemplary embodiment provides a vehicle movement estimation device and a vehicle movement estimation method that may more robustly and highly accurately estimate a movement velocity and a movement direction of a vehicle.

In one general aspect, the techniques disclosed here feature a vehicle movement estimation device including: a radar that is provided in a vehicle and that performs transmission of a radar wave and reception of a reflected wave that is the radar wave reflected by an object; a radar movement estimator that estimates a radar movement velocity and a radar movement direction of the radar based on the reflected wave; an angular velocity estimator that estimates a rotational angular velocity of the vehicle; and a vehicle movement estimator that estimates a movement velocity and a movement direction of a prescribed position of the vehicle based on the radar movement velocity, the radar movement direction, the rotational angular velocity, and a spatial relationship between the radar and the prescribed position.

According to the present disclosure, the movement velocity and movement direction of the vehicle may be estimated more robustly and highly accurately.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 illustrates an example of relationships between a radar viewing angle direction and a Doppler velocity in the first embodiment;

FIG. 8 illustrates one example of an operation of the vehicle movement estimation device according to the first embodiment;

FIG. 14A illustrates one example of a circumstance of movement of the vehicle that is not slipping in the first embodiment;

FIG. 14B illustrates one example of the circumstance of movement of the vehicle that is slipping in the first embodiment;

DETAILED DESCRIPTION

Embodiments of the present disclosure will hereinafter be described in detail with reference to drawings.
(First Embodiment)

In a first embodiment of the present disclosure, a movement velocity and a movement direction of a radar device installed in a vehicle are estimated. In this embodiment, estimation results, an installation position of the radar device in the vehicle (the vehicle origin is the center between rear wheels), a mounting angle of the radar device in the vehicle are used to estimate the movement velocity and movement direction of a prescribed position of the vehicle (hereinafter referred to as "vehicle reference point").

More specifically, in this embodiment, a rotational angular velocity of the vehicle is further estimated, and the movement velocity and movement direction of the vehicle reference point are estimated based on the estimated movement velocity and movement direction of the radar device, the estimated rotational angular velocity, and the spatial relationship between the radar device and the vehicle reference point.

The vehicle mentioned here is, as described above, a moving body that possibly slips on a road surface other than moving straight or moving in a curve (turning) along a certain direction. Further, the vehicle reference point is the middle point between a left rear wheel and a right rear wheel of the vehicle, for example. Further, the plane that passes through the vehicle reference point and is parallel with the road surface will hereinafter be referred to as road surface parallel plane.

<Configuration of Vehicle Movement Estimation Device>

A description will be made about a configuration of a vehicle movement estimation device according to this embodiment. A general configuration of the vehicle movement estimation device will first be described, and specific configurations of units of the vehicle movement estimation device will next be described.

Figure 1:
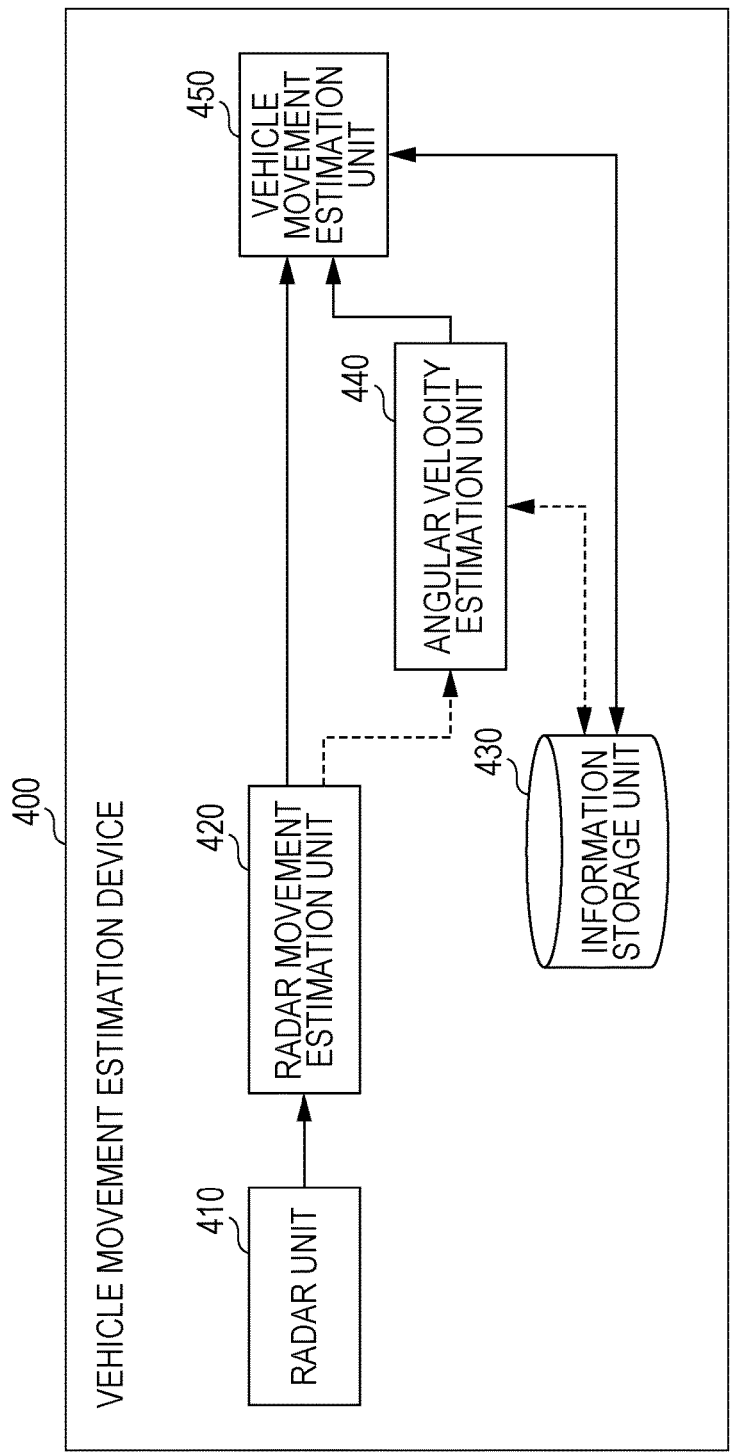
FIG. 1 illustrates one example of a configuration of a vehicle movement estimation device according to a first embodiment of the present disclosure.

FIG. 1 is a block diagram that illustrates one example of the configuration of the vehicle movement estimation device according to the first embodiment.

In FIG. 1, a vehicle movement estimation device 400 has a radar unit 410, a radar movement estimation unit 420, an information storage unit 430, an angular velocity estimation unit 440, and a vehicle movement estimation unit 450.

The radar unit 410 is arranged in the vehicle, transmits radar waves (radar transmission signals), receives reflected waves (reflected wave signals) that is the radar waves reflected by an object, and performs signal processing for received signals (hereinafter referred to as receive signal). The signal processing includes a process of calculating reflected wave information such as a direction of the reflected wave (arrival direction), a distance to an object that is indicated by the reflected wave, a Doppler velocity of the object, and a reflection intensity. The radar unit 410 then outputs the reflected wave information that indicates results of the signal processing to the radar movement estimation unit 420.

The radar unit 410 has a radar device (not illustrated) that transmits radar waves and receives reflected waves for the radar waves. The radar unit 410 may have one radar device or may have two radar devices that are installed in different positions in the vehicle (not illustrated). In a case of installing two radar devices, the radar unit 410 outputs the reflected wave information for each of the radar devices. Further, the two radar devices are installed in different positions at least in the road surface parallel plane.

The radar movement estimation unit 420 estimates the movement velocity of the radar unit 410 (or the radar device) in the road surface parallel plane and the movement direction with respect to an installation direction of each of the radar devices (hereinafter referred to as "radar front direction") and outputs radar movement information that indicates the estimated movement velocity and movement direction of the radar unit 410 to the vehicle movement estimation unit 450.

In a case where the radar unit 410 has two radar devices, the radar movement estimation unit 420 may estimate the movement velocities and movement directions with respect to the radar front directions (hereinafter referred to as "radar movement direction") of the respective radar devices and may output the radar movement information that indicates the movement velocities of the two radar devices to the angular velocity estimation unit 440.

Figure 2:
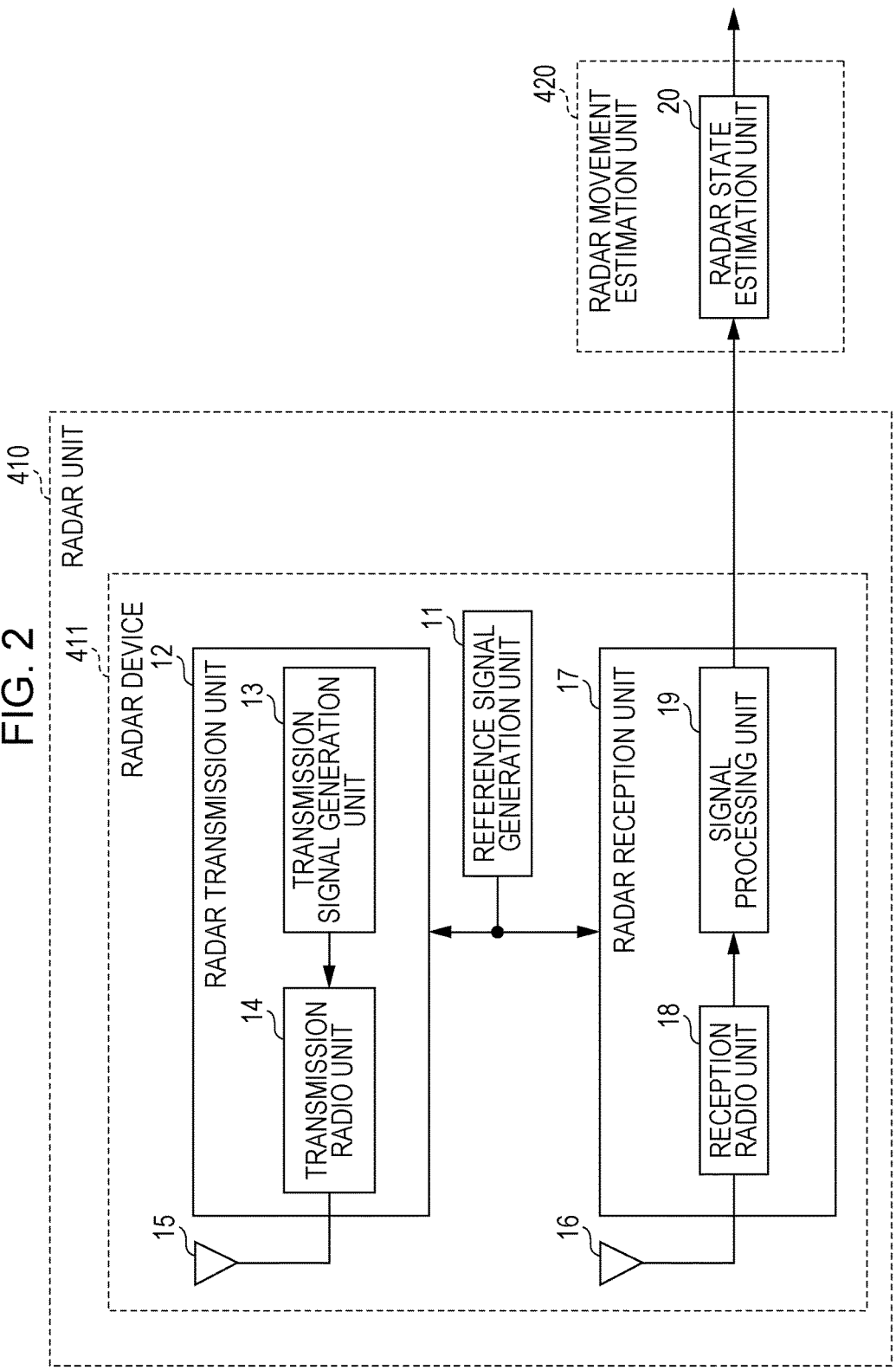
FIG. 2 illustrates one example of a configuration of a radar unit and a radar movement estimation unit in the first embodiment.

FIG. 2 is a block diagram that illustrates one example of a configuration of the radar unit 410 and the radar movement estimation unit 420.

In FIG. 2, the radar unit 410 has a radar device 411. Here, a case will be described where the radar unit 410 has one radar device 411.

The radar device 411 has a reference signal generation unit 11, a radar transmission unit 12, a transmit antenna 15, a receive antenna 16, and a radar reception unit 17. Further, the radar movement estimation unit 420 has a radar state estimation unit 20.

The reference signal generation unit 11, the radar transmission unit 12, the transmit antenna 15, the receive antenna 16, and the radar reception unit 17 configure one radar device 411, for example. The transmit antenna 15 and the receive antenna 16 of the radar device 411 are fixed to a vehicle 511 at least in use.

As described above, the radar unit 410 may have one radar device 411 or may have two radar devices 411. Alternatively, each of the radar devices 411 may include plural pairs of the transmit antenna 15 and the receive antenna 16, and the plural pairs may share one set of the reference signal generation unit 11, the radar transmission unit 12, and the radar reception unit 17 by using a selection switch and may thereby configure the radar device 411. However, the plural pairs are fixed to different positions in the vehicle. Here, the radar device 411 and the radar state estimation unit 20 are illustrated in which the radar unit 410 has one radar movement estimation unit 420 and has one pair of the transmit antenna 15 and the receive antenna 16.

The reference signal generation unit 11 is connected with the radar transmission unit 12 and the radar reception unit 17. The reference signal generation unit 11 supplies reference signals to the radar transmission unit 12 and the radar reception unit 17 and synchronizes processes of the radar transmission unit 12 and the radar reception unit 17.

The radar transmission unit 12 generates the radar transmission signals (radar waves) of a high frequency wave and outputs those to the transmit antenna 15. The radar transmission unit 12 has a transmission signal generation unit 13 and a transmission radio unit 14.

The transmission signal generation unit 13 generates transmission reference clock signals that are the reference signals multiplied by a prescribed number based on the reference signals generated by the reference signal generation unit 11. The transmission signal generation unit 13 operates based on the transmission reference clock signals.

The transmission signals in a baseband that are generated in the transmission signal generation unit 13 are coded pulse signals or chirped pulse signals, for example, and are signals that are repeatedly transmitted in accordance with a prescribed transmission cycle.

The transmission radio unit 14 up-converts the transmission signals generated by the transmission signal generation unit 13 and thereby generates radar transmission signals in a carrier frequency band (for example, a millimeter wave band).

The transmit antenna 15 emits the radar transmission signals generated by the transmission radio unit 14 to a space.

The receive antenna 16 has an array structure, for example, and is configured with plural antennas. The receive antenna 16 receives the radar transmission signals that are reflected by an object (not illustrated) among the radar transmission signals transmitted by the radar transmission unit 12 as reflected wave signals (reflected waves). Radar reception signals (reflected wave signals) of a high frequency wave that are received by the receive antenna 16 are input to the radar reception unit 17. The receive antenna 16 are installed on a side portion of the vehicle, for example, and has the side direction of the vehicle as a viewing angle of the radar. The side portion of the vehicle includes a bumper and a mirror.

The radar reception unit 17 performs signal processing for the reflected wave signals received by the receive antenna 16. The signal processing includes a process of calculating reflected wave information such as a direction of the reflected wave (arrival direction), a distance to an object that is indicated by the reflected wave, a Doppler velocity of the object, and a reflection intensity. The radar reception unit 17 has a reception radio unit 18 and a signal processing unit 19.

The reception radio unit 18 receives the reflected wave signals that are the radar transmission signals reflected by an object by using the receive antenna 16 installed on the side portion of the vehicle. The reception radio unit 18 down-converts the radar reception signals (reflected wave signals) received by the receive antenna 16 and generates reception signals in the baseband.

The signal processing unit 19 computes the correlation between the reception signals input from the reception radio unit 18 and the radar transmission signals transmitted by the radar transmission unit 12 for each transmission cycle of the radar transmission signals and measures a reception delay time of the reflected wave signals, that is, a delay time from a start of transmission of the radar transmission signals.

Further, the signal processing unit 19 performs coherent addition (Doppler frequency analysis) to a correlation computation result in each of the reception delay times. Accordingly, the signal processing unit 19 obtains coherent addition results of plural Doppler frequency components in each of the reception delay times.

In a case where relative motion in a distance direction is present between the object that reflects the radar transmission signals and the radar device 411, the Doppler frequency component is information of frequency fluctuations that occur to the reflected wave signals due to the Doppler effect. That is, the Doppler frequency component is a frequency component that indicates a relative velocity of the object which causes the reflection and serves as a reference, with respect to the radar device 411 in the distance direction.

Further, the signal processing unit 19 obtains a power profile (reflection intensity) of the reflected wave signal for each distance, each azimuth, and each Doppler frequency component by using the coherent addition results of the plural Doppler frequency components. The signal processing unit 19 may obtain the power profile in a case where the coherent addition result of the Doppler frequency component is equal to or larger than a threshold value that exceeds a noise level.

Further, the signal processing unit 19 uses the power profiles to estimate the arrival direction of the reflected wave signals and obtain the relative velocity (Doppler velocity) of the object with respect to the radar device 411.

For example, the signal processing unit 19 converts the Doppler frequency component to a Doppler velocity component. The signal processing unit 19 uses the reflected wave signals to measure directions (directions in a radar viewing angle), distances, Doppler velocities with respect to the vehicle, and reflection intensities (power) of plural objects that are present in the viewing angle of the radar unit 410. The signal processing unit 19 then outputs the reflected wave information that indicates the measured directions, distances, Doppler velocities, and reflection intensities to the radar state estimation unit 20 of the radar movement estimation unit 420.

The radar state estimation unit 20 estimates the movement velocity (hereinafter referred to as "radar movement velocity") and movement direction (hereinafter referred to as "radar movement direction") of the radar device 411 that includes the receive antenna 16 based on the output reflected wave information.

Figure 3:
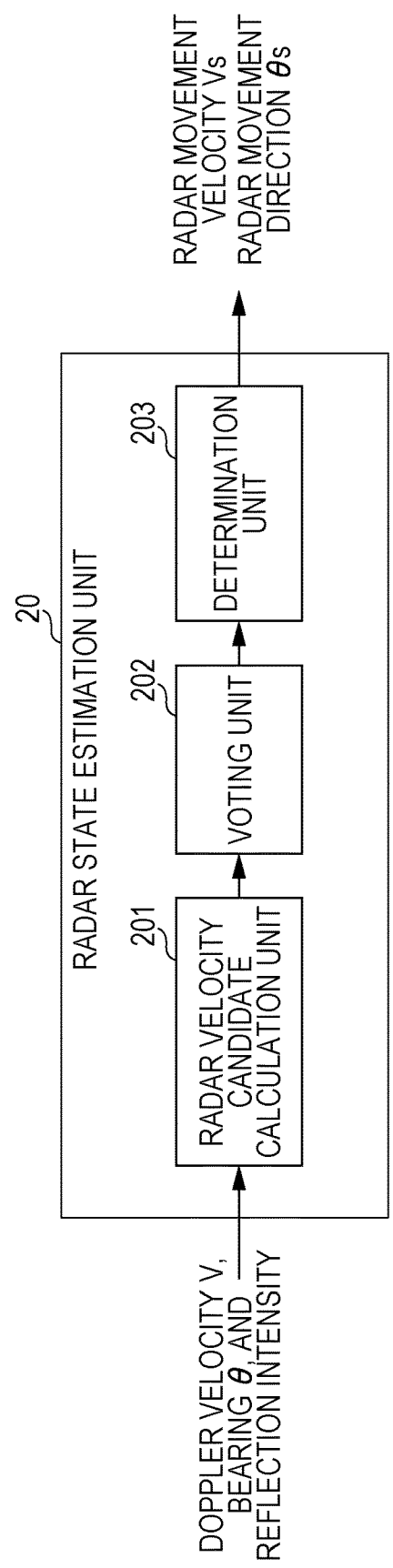
FIG. 3 illustrates one example of a configuration of a radar state estimation unit in the first embodiment.

FIG. 3 is a block diagram that illustrates one example of a configuration of the radar state estimation unit 20.

In FIG. 3, the radar state estimation unit 20 has a radar velocity candidate calculation unit 201, a voting unit 202, and a determination unit 203.

The radar velocity candidate calculation unit 201 calculates a radar movement velocity candidate Vs for each radar movement direction candidate θs of the radar device 411 by using a radar viewing angle direction θ and a Doppler velocity V of each of the reflected waves. The radar velocity candidate calculation unit 201 then outputs the calculated radar movement velocity candidate Vs for each of the radar movement direction candidates θs to the voting unit 202.

Here, the radar viewing angle direction θ is the arrival direction of the reflected wave in the radar viewing angle. The radar movement direction candidates θs are plural candidates of the movement direction, which may serve as the movement direction of the radar device 411. The radar movement velocity candidate Vs is a candidate of the radar movement velocity.

The radar movement direction candidate θs and radar movement velocity candidate Vs have a prescribed relationship. The relationship between the radar movement direction candidate θs and radar movement velocity candidate Vs will be described later.

The voting unit 202 casts votes in the ballot box by casting the radar movement velocity candidate Vs that corresponds to the radar movement direction candidate θs as one vote in a two-dimensional ballot box in which a radar movement direction axis and a radar movement velocity axis are quantized. The voting unit 202 then outputs vote results to the determination unit 203.

The determination unit 203 determines a radar movement velocity Vsd and a radar movement direction θsd of the radar device 411 (a present movement state of the radar device 411) based on the output vote results. The determination unit 203 then outputs radar movement information that indicates the determined radar movement velocity Vsd and radar movement direction θsd of the radar device 411 to the vehicle movement estimation unit 450 (and the angular velocity estimation unit 440).

The information storage unit 430 in FIG. 1 in advance stores arrangement information that indicates the relative positions of the radar unit 410 which includes the transmit antenna 15 and the receive antenna 16 with respect to the vehicle reference point. More specifically, the arrangement information includes installation position information that indicates an installation position of the radar device 411 with respect to the vehicle reference point as a reference and installation orientation information that indicates an installation orientation of the radar device 411 with respect to the vehicle front as a reference.

The arrangement information may include information that defines the position of the vehicle reference point in the road surface parallel plane. Further, in a case where the radar unit 410 has two radar devices, the arrangement information may be information that indicates the relative positions of the two radar devices with respect to the vehicle reference point.

The angular velocity estimation unit 440 estimates a rotational angular velocity of the vehicle in the road surface parallel plane (that is, an angular velocity in the yaw direction) based on the output radar movement information and outputs rotational angular velocity information that indicates an estimation result to the vehicle movement estimation unit 450.

In a case where the radar movement information of one radar device is output from the radar movement estimation unit 420, the angular velocity estimation unit 440 may have an angular velocity sensor such as a gyroscope.

Further, in a case where the radar movement information of two radar devices is output from the radar movement estimation unit 420, the angular velocity estimation unit 440 may estimate the rotational angular velocity of the vehicle based on two radar movement velocities, two radar movement directions, the distance between the two radar devices (hereinafter referred to as "radar-to-radar distance"). The angular velocity estimation unit 440 acquires the radar-to-radar distance based on the arrangement information stored in the information storage unit 430, for example.

The vehicle movement estimation unit 450 estimates the movement velocity (hereinafter referred to as "vehicle movement velocity") and movement direction (hereinafter referred to as "vehicle movement direction") of the vehicle reference point of the vehicle based on the output radar movement information and rotational angular velocity information, and the spatial relationship between the radar unit 410 and the vehicle reference point. The vehicle movement estimation unit 450 then outputs vehicle movement information that indicates estimation results to a drive control system or the like of the vehicle. The vehicle movement estimation unit 450 acquires the spatial relationship between the radar unit 410 and the vehicle reference point based on the arrangement information stored in the information storage unit 430, for example.

The vehicle reference point may be an arbitrary position. That is, the vehicle movement estimation unit 450 may receive an input of a position (coordinate values) of the vehicle reference point from a user.

Although not illustrated, the vehicle movement estimation device 400 has a central processing unit (CPU), a storage medium such as a read only memory (ROM) that stores control programs, and a working memory such as a random access memory (RAM), for example. In this case, functions of the above-described units are realized by execution of the control programs by the CPU, for example.

However, a hardware configuration of the vehicle movement estimation device 400 is not limited to such an example. For example, function units of the vehicle movement estimation device 400 may be realized as an integrated circuit (IC). The function units may be formed into individual chips or formed into one chip that includes a portion or all of those.

The vehicle movement estimation device 400 that has such a configuration may estimate the radar movement velocity and radar movement direction of the radar device 411 arranged in the vehicle and the rotational angular velocity of the vehicle. Further, the vehicle movement estimation device 400 may estimate the vehicle movement velocity and vehicle movement direction based on the spatial relationship between the radar device 411 and the vehicle reference point, the estimated radar movement velocity and radar movement direction of the radar device 411, and the estimated rotational angular velocity of the vehicle.

<Doppler Velocity in Case of Plural Stationary Objects being Present>

Here, a description will be made about the relationship between the radar viewing angle direction θ and the Doppler velocity V in a case where plural stationary objects are present in the viewing angle of the radar device 411.

Many objects that are stationary such as wall surfaces of roads and guard rails or that may be assumed to be stationary such as persons staying still (hereinafter referred to as "stationary object") are present around the vehicle. Here, a description will be made about the relationship between the radar viewing angle direction and the Doppler velocity in a case where many stationary objects are present around the vehicle.

FIG. 4 is a diagram that illustrates examples of the radar viewing angle direction θ and the Doppler velocity V, which may be obtained from the power profiles (hereinafter referred to as direction-Doppler map). In FIG. 4, the horizontal axis represents the radar viewing angle direction θ, and the vertical axis represents the Doppler velocity V. Further, open circles indicated in FIG. 4 represent reflected wave signals that have intensities equal to or higher than a threshold value and include stationary objects and moving objects. Further, the size (area) of the open circle indicated in FIG. 4 represents the intensity of reflection from an object. Further, here, a case is illustrated where the reflected wave arrives from each of plural stationary objects.

Further, FIGS. 5A to 7B are diagrams for explaining the relationship between the radar viewing angle direction θ and a relative velocity (Doppler velocity) obtained by the reflected wave from a stationary object for each stationary object, with respect to the Doppler velocity V in each direction indicated in FIG. 4.

Figure 5B:
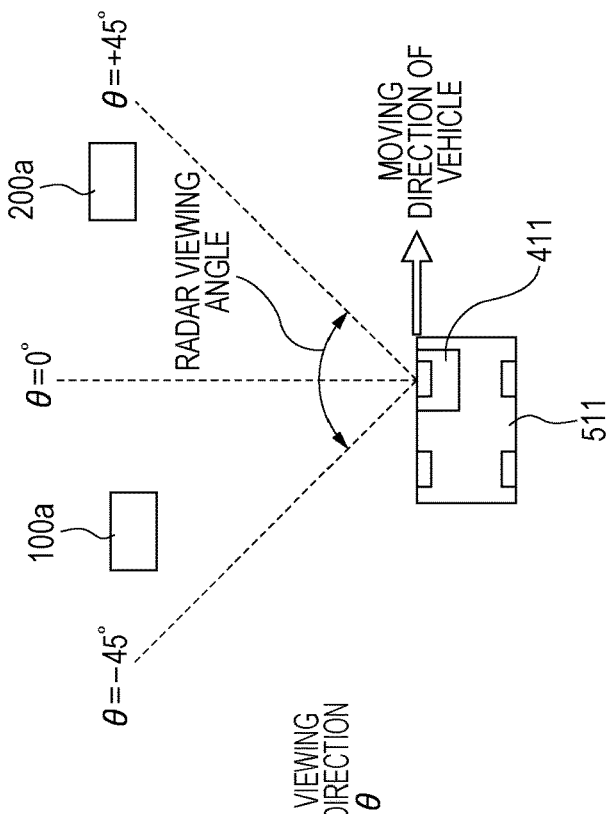
FIG. 5B illustrates the relationship among the radar viewing angle direction, a moving direction of a vehicle, and the positions of stationary objects (100a and 200a) in the first embodiment.
Figure 5A:
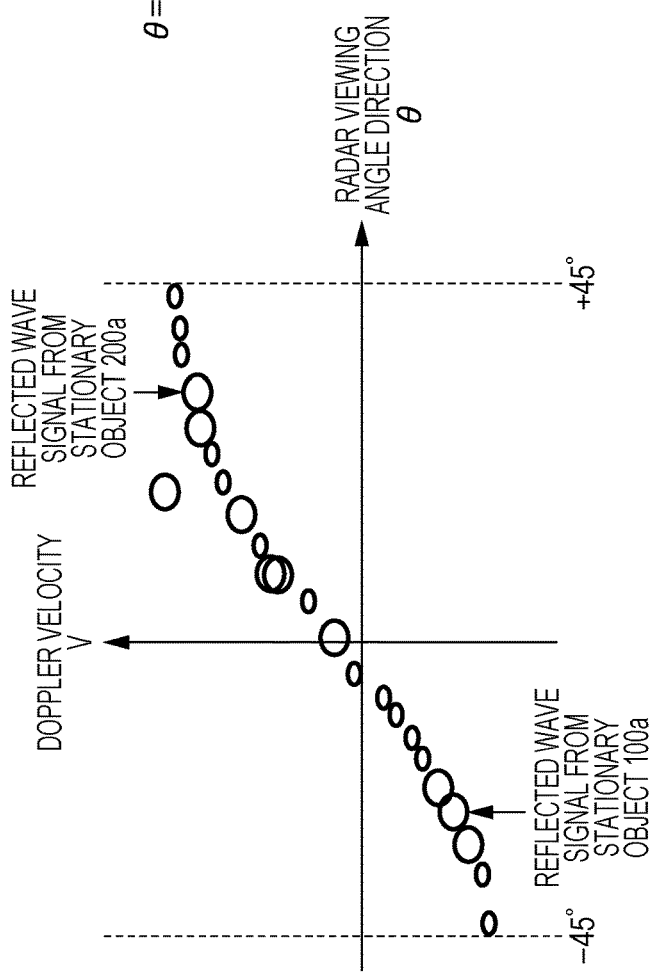
FIG. 5A illustrates the relationship between the radar viewing angle direction and the Doppler velocity in the first embodiment.
Figure 6B:
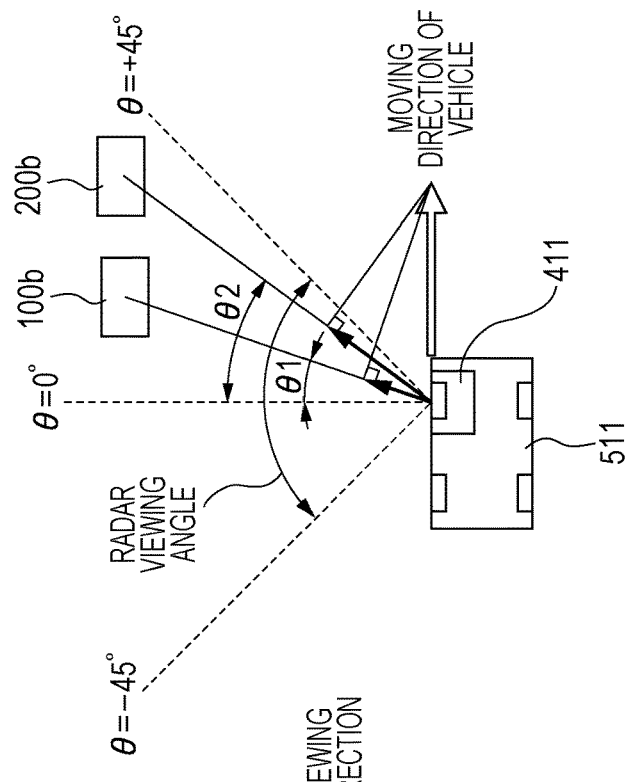
FIG. 6B illustrates the relationship among the radar viewing angle direction, the moving direction of the vehicle, and the positions of stationary objects (100b and 200b) in the first embodiment.
Figure 6A:
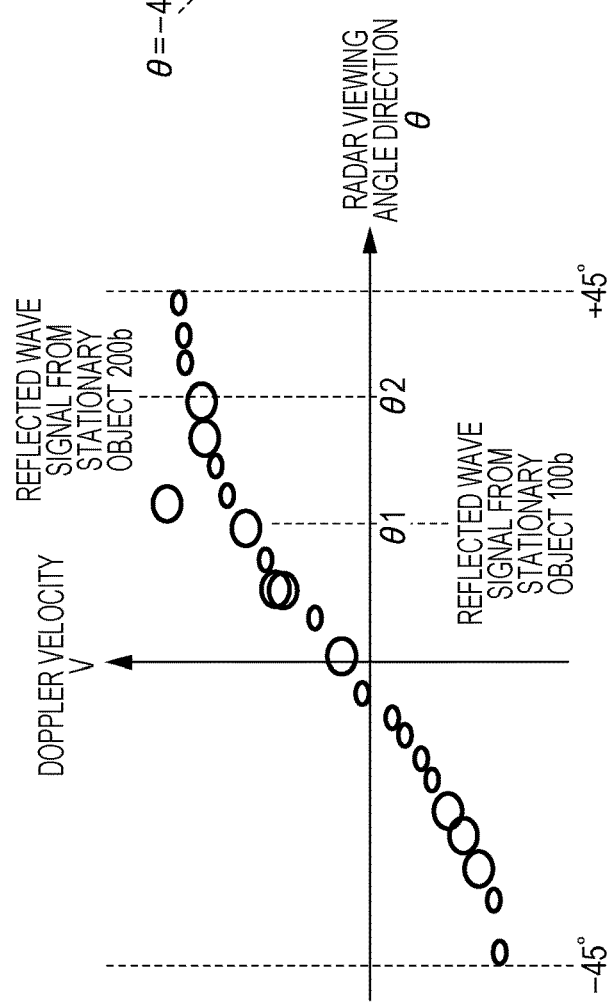
FIG. 6A illustrates the relationship between the radar viewing angle direction and the Doppler velocity in the first embodiment.

FIGS. 5A and 6A are diagrams that illustrate the relationship between the Doppler velocity V and the radar viewing angle direction θ, which are estimated in a case where the vehicle 511 moves straight and the radar device 411 is installed on a left side of the vehicle 511. FIGS. 5B and 6B are diagrams that illustrate the relationship among the radar viewing angle direction θ of the radar device 411 installed in the vehicle 511 in a straight moving state, the moving direction of the vehicle 511, and the positions of the reflected wave signals from stationary objects 100a and 200a.

The moving direction of the vehicle 511 is the movement direction that corresponds to drive of wheels and is the same as the vehicle movement direction in a state where the vehicle is not slipping.

Figure 9:
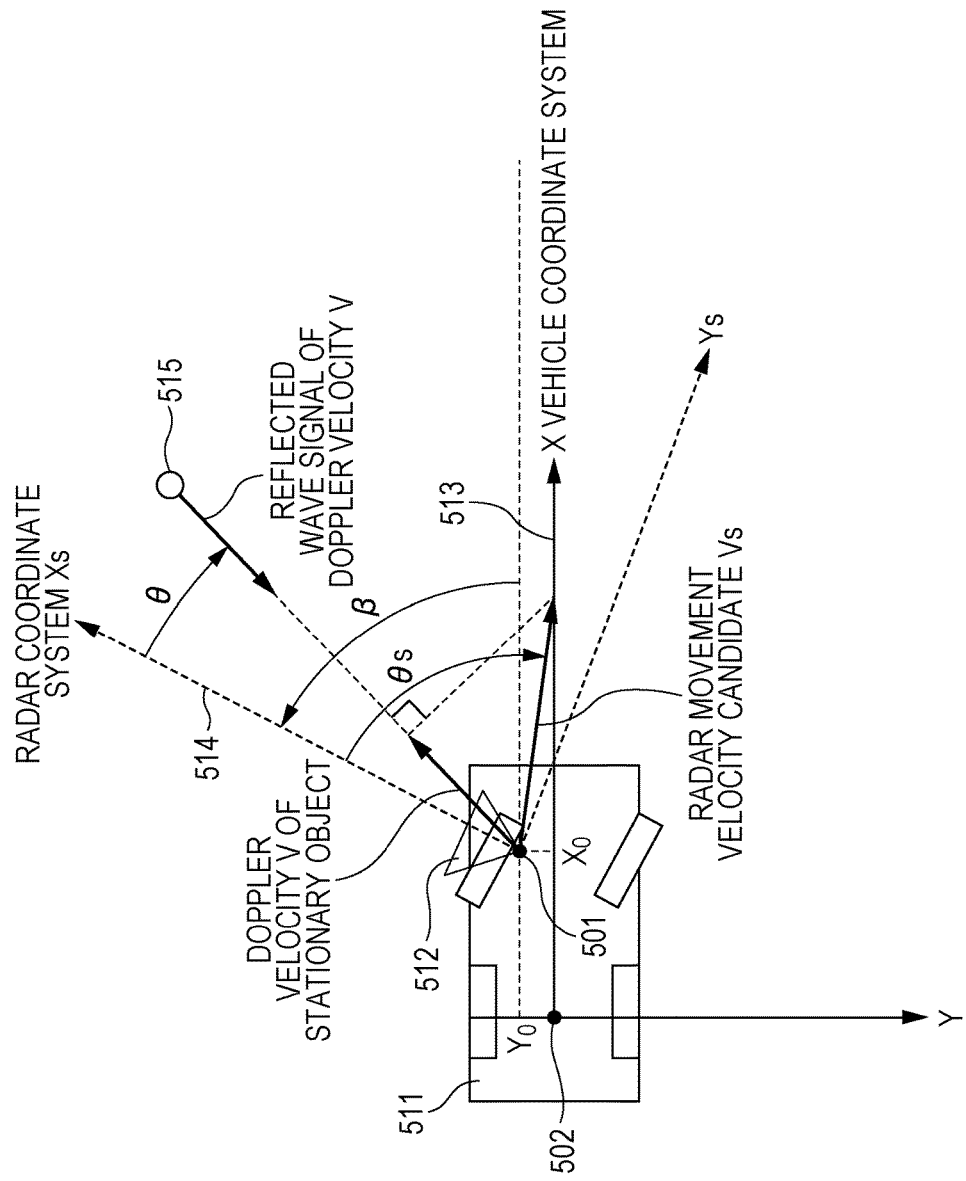
FIG. 9 illustrates one example of an installation state of a radar device in the first embodiment.

FIGS. 5B and 6B illustrate an example where the radar device 411 is installed such that the direction in which the radar viewing angle direction θ=0° is the lateral direction on the left side of the vehicle (the orthogonal direction to the front direction of the vehicle 511) (that is, β=−90° in FIG. 9). Further, the range of the radar viewing angle direction θ is −45° to +45°.

In a case where the direction in which the radar viewing angle direction θ=0° is the direction vertical to the left side of the vehicle (β=−90° and a stationary object is present in the front of the vehicle, the Doppler velocity V of the stationary object becomes a maximum. Thus, in FIGS. 5B and 6B, the Doppler velocity V at θ=+45° (the closest direction to the vehicle front direction for the radar device 411) becomes a maximum value.

Further, because the stationary object 100a illustrated in FIG. 5B is positioned in a separating direction from the radar device 411, the Doppler velocity in the direction in which the stationary object 100a is present becomes a negative value in FIG. 5A. On the other hand, because the stationary object 200a illustrated in FIG. 5B is positioned in an approaching direction to the radar device 411, the Doppler velocity in the direction in which the stationary object 200a is present becomes a positive value in FIG. 5A.

Further, because stationary objects 100b and 200b in FIG. 6B are positioned in the approaching direction to the radar device 411, the Doppler velocities in the directions in which the stationary objects 100b and 200b are present (the radar viewing angle directions) become positive values in FIG. 6A. However, in FIG. 6A, the Doppler velocity is more influenced by velocity components of the vehicle 511 as the azimuth (the absolute value of the radar viewing angle direction θ) increases. In FIG. 6B, a radar viewing angle direction θ2 in which the stationary object 200b is positioned is large compared to a radar viewing angle direction θ1 in which the stationary object 100b is positioned (|θ1|<|θ2|). Thus, the Doppler velocity (absolute value) of the stationary object 200b becomes larger than the Doppler velocity (absolute value) of the stationary object 100b.

Figure 7B:
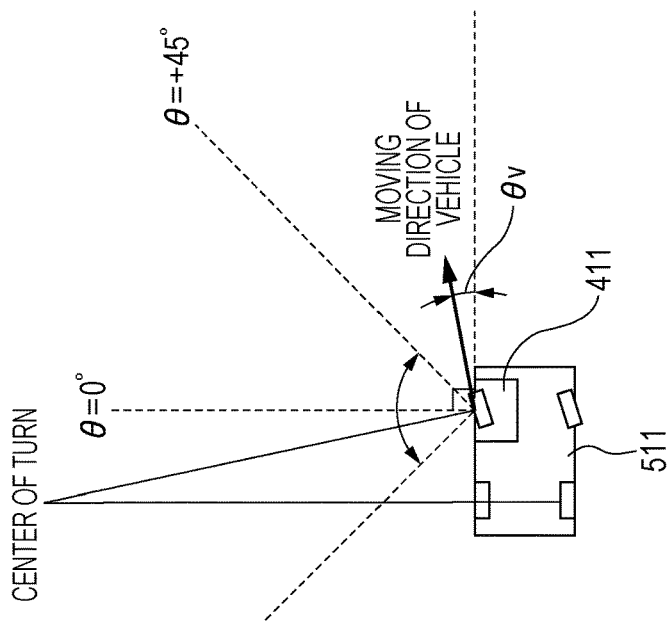
FIG. 7B illustrates the relationship among the radar viewing angle direction, the moving direction of the vehicle, and a center of turn in the first embodiment.
Figure 7A:
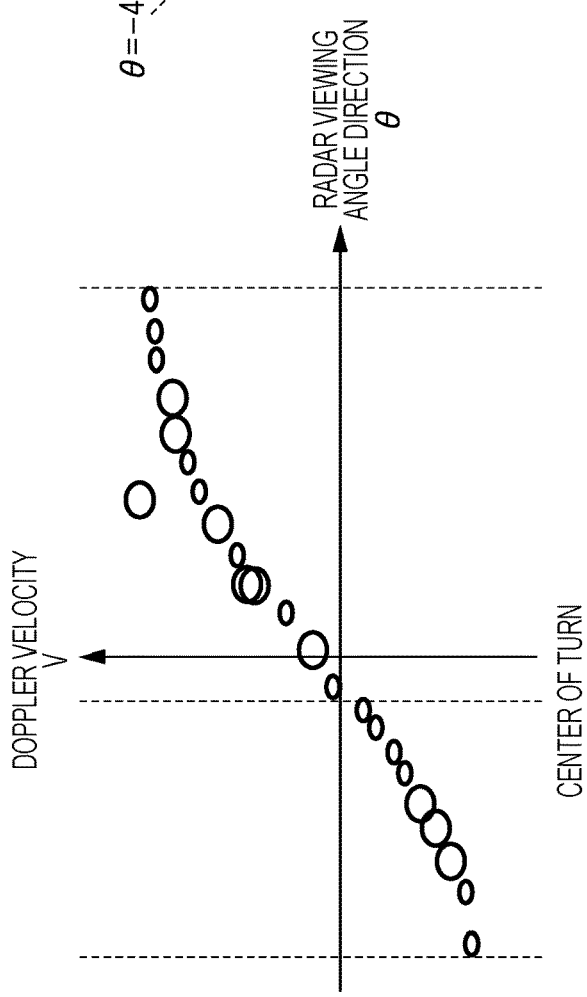
FIG. 7A illustrates the relationship between the radar viewing angle direction and the Doppler velocity in the first embodiment.

FIGS. 7A and 7B illustrate a state and data in a case where the vehicle 511 turns left. In FIGS. 7A and 7B, because the radar device 411 is installed right above a left front wheel of the vehicle 511 and the radar movement direction of the radar device 411 is the direction of the front wheels, the center of turn is in the perpendicular direction.

FIG. 7A is a diagram that illustrates the relationship between the Doppler velocity and the radar viewing angle direction θ (Direction-Doppler map) in a case where the vehicle 511 is turning left. FIG. 7B is a diagram that illustrates the relationship among the radar viewing angle direction of the radar device 411 installed in the vehicle 511, which is turning left, the moving direction θv of the vehicle 511, and the direction of the center of turn of the vehicle.

Similarly to FIGS. 5B and 6B, FIG. 7B illustrates an example where the radar device 411 is installed such that the direction in which the radar viewing angle direction θ=0° is the lateral direction on the left side of the vehicle (the orthogonal direction to the front direction of the vehicle 511) (that is, β=−90° in FIG. 9). Further, the range of the radar viewing angle direction θ is −45° to +45°.

In FIG. 7B, because the direction in which the radar viewing angle direction θ=0° is the lateral direction on the left side of the vehicle (β=−90°), the Doppler velocity becomes a maximum value in the moving direction of the vehicle 511.

Thus, in FIG. 7A, for the vehicle 511 that is turning left, the Doppler velocity at θ=+45° (the closest direction to the moving direction of the vehicle 511 for the radar device 411) becomes a maximum value. Further, the direction in which the Doppler velocity becomes zero is the direction toward the center of turn of the vehicle. In FIG. 7B, the front direction at 90° with respect to the direction toward the center of turn of the vehicle is the moving direction of the vehicle 511 (the same applies to FIGS. 5B and 6B).

The Doppler velocity obtained by the reflected wave from a stationary object is independent from the distance from the stationary object.

<Relationship between Movement of Radar Device and Movement of Vehicle Reference Point in Case of Not Slipping>

Here, a description will be made about the relationship between the radar movement velocity Vsd and radar movement direction θsd and a vehicle movement velocity V' and vehicle movement direction α' in a case where the vehicle is not slipping.

In the straight moving state where a steering wheel is not turned, the movement velocity and movement direction in every position in the vehicle 511 is the same. On the other hand, in a turning state where the steering wheel is turned, the movement velocity and movement direction in each position in the vehicle 511 is different.

In a common automobile, because steered wheels are the front wheels and the rear wheels are fixed, as illustrated in FIG. 7B, the center of turn of the vehicle is present on an extension line that connects the left and right rear wheels in the vehicle 511 in the turning state. Here, because the vehicle 511 as the whole turns while the center of turn is on the extension line that connects the left and right rear wheel of the vehicle 511, the movement direction of the left and right rear wheels of the vehicle 511 is the tangential direction of the circle of the turn and is the front-rear direction of the vehicle 511.

However, because the left and right front wheels of the vehicle 511 move in the direction in which the front wheels are directed due to steering, the movement direction of the left and right front wheels is different from the left and right rear wheels. In addition, the radius of turn is different in accordance with the position in the vehicle, and the velocity in each position of the vehicle is thus different.

Thus, a general vehicle velocity is defined as the velocity of the central position between the left and right rear wheels (the vehicle reference point) that does not fluctuate with respect to a turn of the vehicle.

As described above, the vehicle movement velocity V' and vehicle movement direction α' may be calculated by using the radar movement velocity Vsd and radar movement direction θsd, the installation position information, and the installation orientation information.

In a case where the vehicle 511 is not slipping, the vehicle movement estimation unit 450 may calculate the position in which the perpendicular direction to the radar movement direction intersects with the extension line that connects the left and right rear wheels as the center of turn of the vehicle based on the radar movement direction of the installation position of the radar device 411 (FIG. 7B). Thus, the vehicle movement estimation unit 450 may calculate the rotational angular velocity in a case where the vehicle turns by using the distance between the center of turn and the installation position of the radar device 411 and the radar movement velocity of the installation position. Further, the vehicle movement estimation unit 450 may calculate motion of the vehicle 511 in the turning state and may calculate the movement velocity and movement direction in an arbitrary position in the vehicle 511, which includes the vehicle reference point.

<Relationship between Movement of Radar Device and Movement of Vehicle Reference Point in Case of Slipping>

In a case where the vehicle 511 is slipping, the rotational center of rotary motion of the vehicle 511 is not necessarily present on the extension line that connects the left and right rear wheels, and it is highly possible that the hypothesis that the movement direction of the two rear wheels is the front direction does not hold true. Accordingly, it is difficult for the vehicle movement estimation unit 450 to estimate the vehicle movement velocity V' and vehicle movement direction α' from one radar movement velocity Vsd, one radar movement direction θsd, and the arrangement information. Thus, the vehicle movement estimation unit 450 further estimates a rotational angular velocity w of the vehicle 511 and uses the estimated rotational angular velocity ω. Details of estimation of the vehicle movement velocity V' and vehicle movement direction α' by using the rotational angular velocity ω of the vehicle 511 will be described later.

<Operation of Vehicle Movement Estimation Device>

An operation of the vehicle movement estimation device 400 will next be described.

FIG. 8 is a flowchart that illustrates one example of the operation of the vehicle movement estimation device 400.

In step (hereinafter referred to as "ST") 1000, the radar unit 410 transmits the radar transmission signals and receives the reflected wave signals of the radar transmission signals in one radar device 411 or each of plural radar devices 411.

In ST2000, the radar unit 410 acquires (calculates) the Doppler velocity and direction for each frame of the reflected wave signals in one signal processing unit 19 or each of plural signal processing units 19. That is, the radar unit 410 acquires the direction-Doppler map.

In ST3000, the radar movement estimation unit 420 estimates the movement velocity and movement direction of the radar device 411 (the radar movement velocity Vsd and radar movement direction θsd) by using the direction-Doppler map in one radar state estimation unit 20 or each of plural radar state estimation units 20.

Specifically, the radar state estimation unit 20 selects a prescribed number of stationary object samples from the input reflected wave signals (that is, the direction-Doppler map illustrated in FIG. 4). The radar state estimation unit 20 performs a voting process for each of the prescribed number of selected stationary object samples by using the direction azimuth angle θ, Doppler velocity V, and reflection intensity of the sample. The radar state estimation unit 20 then determines the radar movement velocity Vsd and radar movement direction θsd based on the voting results. Details of the voting process will be described later.

In ST4000, the angular velocity estimation unit 440 estimates the rotational angular velocity ω of the vehicle based on the radar movement velocity Vsd of one radar device 411 or each of plural radar devices 411, a measurement value of a gyroscope, or the like.

In ST5000, the vehicle movement estimation unit 450 estimates the movement velocity and movement direction of the vehicle reference point (the vehicle movement velocity V' and vehicle movement direction α') based on the estimated radar movement velocity Vsd, radar movement direction θsd, the rotational angular velocity ω of the vehicle, and the arrangement information. Details of estimation of the vehicle movement velocity V' and vehicle movement direction α' by using the rotational angular velocity ω will be described later.

In ST6000, the vehicle movement estimation unit 450 then outputs the vehicle movement information that indicates estimation results.

<Relationship between Radar Movement Direction Candidate θs and Radar Movement Velocity Candidate Vs>

Here, the relationship between the radar movement direction candidate θs and radar movement velocity candidate Vs will be described.

FIG. 9 is a diagram that illustrates one example of an installation state of the radar device 411 in the vehicle (a bird's-eye view from above).

As illustrated in FIG. 9, a position (hereinafter referred to as "radar position") 501 of the radar device 411 is around the left front wheel of the vehicle 511, for example. A radar viewing angle 512 of the radar device 411 is directed toward a left front side of the vehicle 511. The angle between a radar front direction 514, which is the center direction of the radar viewing angle of the radar device, and the front-rear (longitudinal) direction of the vehicle is (β.

The vehicle movement estimation device 400 uses two kinds of coordinate systems, which are a vehicle coordinate system and a radar coordinate system, for example.

As illustrated in FIG. 9, the vehicle coordinate system is a two-dimensional coordinate system that has the center of the left and right rear wheels of the vehicle 511 as the origin and is parallel to the road surface. The vehicle coordinate system is formed with an X axis that corresponds to the front-rear direction of the vehicle 511 and a Y axis that corresponds to the width direction of the vehicle 511. Further, the vehicle coordinate system is a coordinate system in which the front direction of the vehicle 511 is set as zero degree and the clockwise direction is set as the positive direction.

Meanwhile, as illustrated in FIG. 9, the radar coordinate system is a coordinate system in which the radar position 501 is set as the origin, the radar front direction 514 is set as zero degree, and the clockwise direction is set as the positive direction. The radar position 501 and the radar front direction 514 are defined by the vehicle coordinate system. In FIG. 9, the radar position 501 in the vehicle coordinate system is a position $(X_0, Y_0)$, and the mounting angle is (β. Here, β is a negative value.

The radar state estimation unit 20 first input direction-Doppler map information in the radar coordinate system as illustrated in FIG. 4 from the signal processing unit 19. As illustrated in FIGS. 5A to 7B, the reflected wave signals from plural stationary objects become one curve in the direction-Doppler map.

In FIG. 9, it is assumed that the radar movement velocity candidate is Vs, the radar movement direction candidate is θs, and an object 515 is a stationary object in the radar coordinate system. In this case, the relationship expressed by the following equation (1) holds true about the Doppler velocity V and radar viewing angle direction θ (hereinafter referred to as "direction θ") obtained from the object 515, the radar movement velocity candidate Vs, and the radar movement direction candidate θs. The radar movement direction candidate θs corresponds to a steering angle of the steering wheel in a case where the vehicle is not slipping.

$$V = Vs \times \cos(\theta s - \theta) \quad (1)$$

The equation (1) may be modified to the following equation (2).

$$Vs = V/\cos(\theta s - \theta) \quad (2)$$

That is, in a case where the reflected wave signals are reflected by a stationary object, the radar movement direction candidate θs of the radar device 411 is set, and the radar movement velocity candidate Vs may thereby be calculated based on the Doppler velocity V and direction θ of the reflected wave signals.

In other words, the radar movement direction candidate θs is changed, and the relationship between the radar movement direction candidate θs and radar movement velocity candidate Vs, which is not inconsistent with the direction θ and Doppler velocity V of the reflected wave, may thereby be obtained. Plural relationships like the above relationship may be obtained in a case where plural stationary objects are present, that is, from plural (θ, V) pairs. Further, in a case where the radar movement direction candidate θs is known and a stationary object in a prescribed direction θ in the radar coordinate system and at a prescribed Doppler velocity V is present, the radar movement velocity candidate Vs may be calculated based on the equation (2). The equation (2) holds true for every stationary object that has different direction θ and Doppler velocity V. That is, the equation (2) that satisfies the true value θsd of the radar movement direction and the true value Vsd of the movement velocity holds true for every stationary object.

Accordingly, the radar state estimation unit 20 performs the voting process, which will be described later, and thereby searches for the radar movement direction candidate θs and radar movement velocity candidate Vs that conform with most stationary object samples (that is, the equation (2) holds true) among plural stationary object samples (indicated by (θ, V) pairs) obtained for plural stationary objects. The radar state estimation unit 20 then sets the search results as the radar movement velocity Vsd and radar movement direction θsd.

Specifically, the radar state estimation unit 20 (the radar velocity candidate calculation unit 201) first sets plural radar movement direction candidates θs by using the equation (2), Doppler velocities V, and directions θ for each of the stationary objects of the reflected wave signals. The radar state estimation unit 20 then calculates the radar movement velocity candidate Vs for each of the set radar movement direction candidates θs. The relationship between the radar movement direction candidate θs and radar movement velocity candidate Vs, which is not inconsistent with the direction θ and Doppler velocity V of the reflected wave, may be represented by a curve, for example.

Figure 10:
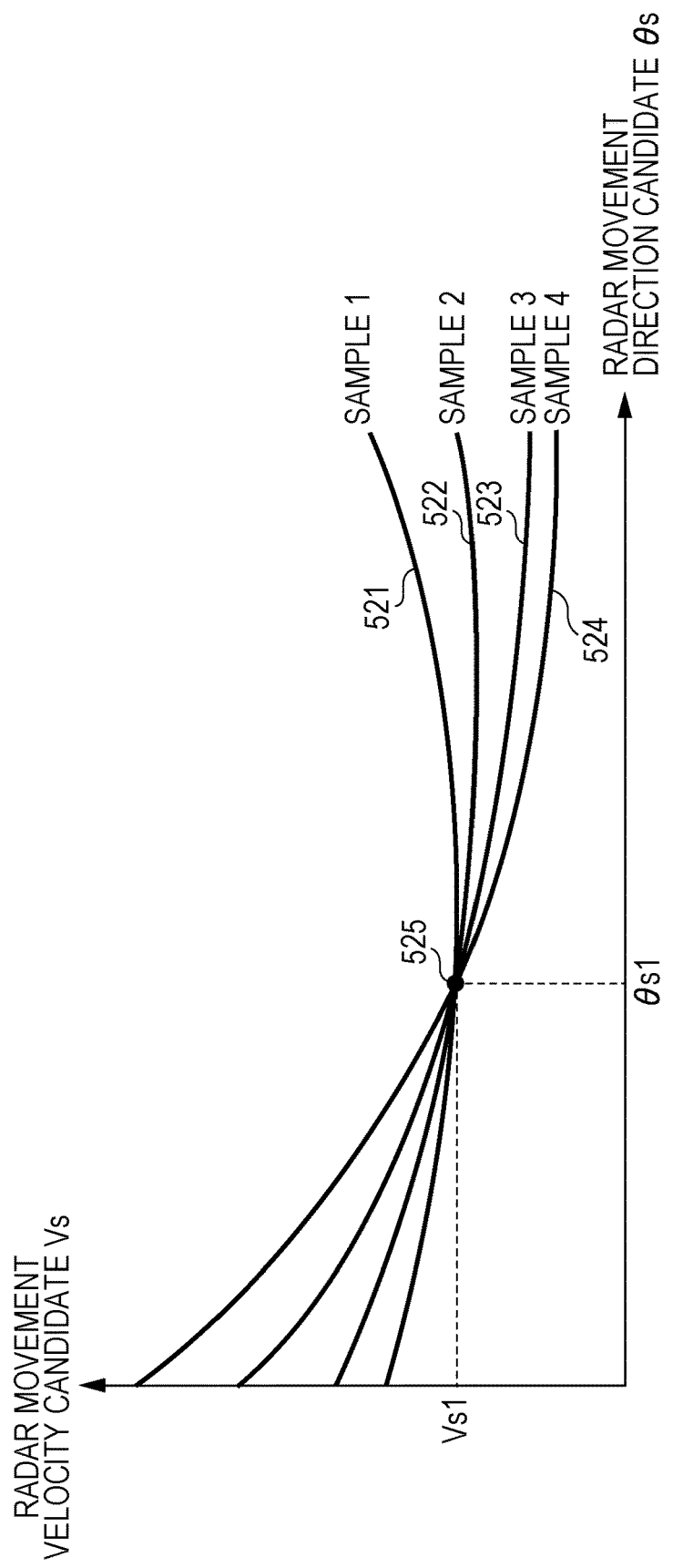
FIG. 10 illustrates one example of the relationship between radar movement direction candidates and radar movement velocity candidates of plural samples in the first embodiment.

FIG. 10 is a diagram that illustrates one example of the relationship between the radar movement direction candidate θs and radar movement velocity candidate Vs, which may be obtained for the directions θ and Doppler velocities V of four samples (stationary objects), by four curves. In FIG. 10, the horizontal axis represents the radar movement direction candidate θs, and the vertical axis represents the radar movement velocity candidate Vs.

As illustrated in FIG. 10, for example, in a case where the reflected wave signals for the four samples are present, four curves 521 to 524 derived from the equation (2) may be obtained based on the Doppler velocities V and directions θ of the respective reflected wave signals.

A point 525 through which the curves 521 to 524 pass conforms with each of the four samples (four pairs of the Doppler velocities V and directions θ). Accordingly, a radar movement direction candidate θs1 and radar movement velocity candidate Vs1 at the point 525 is highly possibly the true movement velocity Vsd and true movement direction θsd of the radar. Thus, the radar state estimation unit 20 searches for the point 525 by a vote.

<Details of Voting Process>

Details of the voting process in the radar state estimation unit 20 will next be described.

Figure 11:
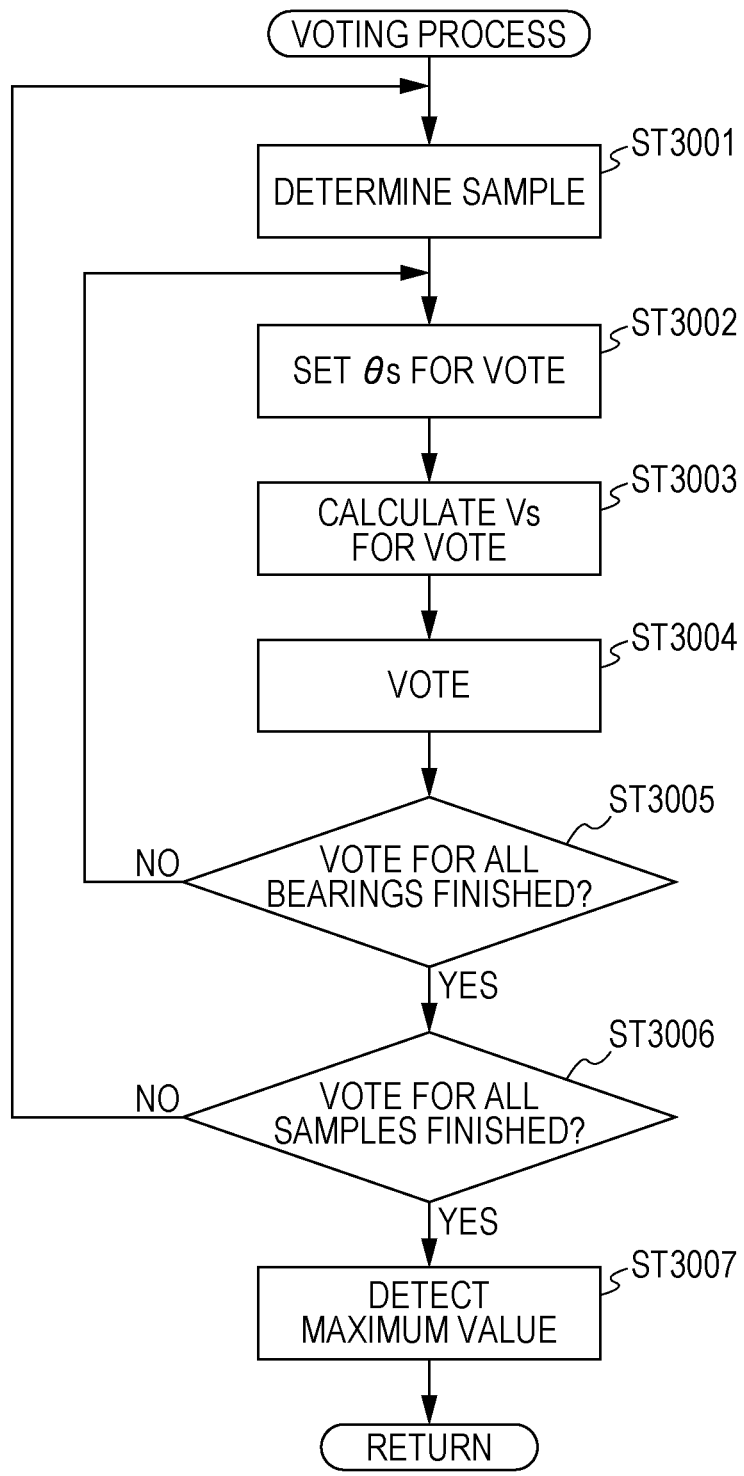
FIG. 11 illustrates one example of a voting process in the first embodiment.

FIG. 11 is a flowchart that illustrates one example of the voting process (ST3000 in FIG. 8) in the radar state estimation unit 20.

The radar velocity candidate calculation unit 201 in advance selects a prescribed number of samples (stationary objects) from the reflected wave signals (for example, the direction-Doppler map illustrated in FIG. 4) calculated in the signal processing unit 19. Each of the samples has at least information of the Doppler velocity V, direction θ, and reflection intensity.

In ST3001, the radar velocity candidate calculation unit 201 determines one sample from the prescribed number of samples as a target of the voting process. After the voting process about all the radar movement direction candidates for one sample as the target is finished (Yes in ST3005 described later), the radar velocity candidate calculation unit 201 sequentially determines other samples as new targets of the voting process until all the prescribed number of samples are selected (until Yes is obtained in ST3006 described later).

In ST3002, the radar velocity candidate calculation unit 201 sets the radar movement direction candidates θs for the vote, which are the targets of the voting process, from plural radar movement direction candidates θs. For example, the radar velocity candidate calculation unit 201 sequentially sets other radar movement direction candidates θs for the vote as new targets of the voting process until all the radar movement direction candidates θs are set (until Yes is obtained in ST3005 described later).

Specifically, the radar velocity candidate calculation unit 201 sets the radar movement direction candidates θs for the vote in accordance with state candidates of the ballot box that is prepared by the voting unit 202. The ballot box is a state space like a matrix, in which plural radar movement direction candidates θs and plural radar movement velocity candidates Vs in the range of possible values of the velocity of the radar device 411 are in advance set.

Figure 12:
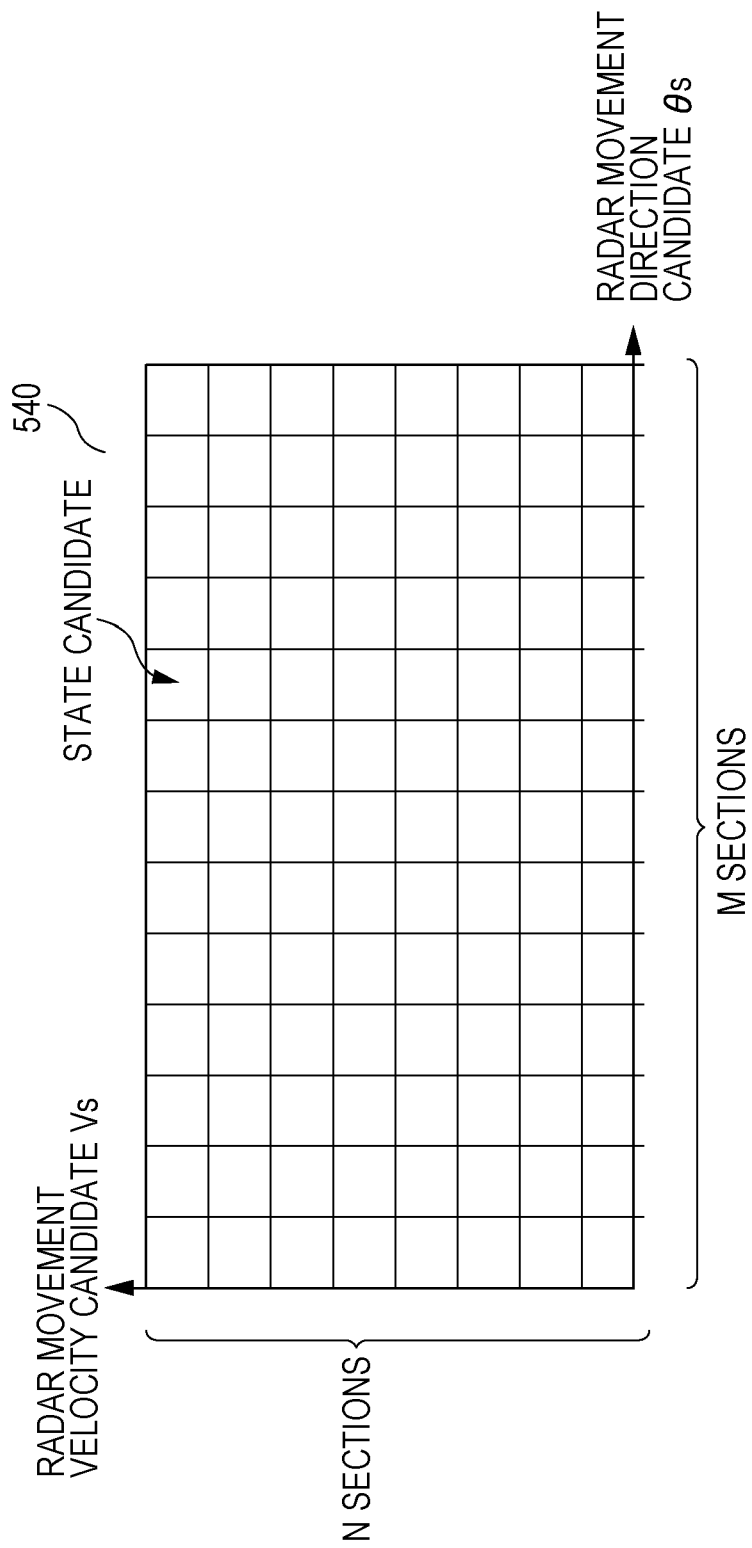
FIG. 12 illustrates one example of a concept of a ballot box in the first embodiment.

FIG. 12 is a diagram that illustrates one example of a concept of the ballot box that is prepared by the voting unit 202. In FIG. 12, the horizontal axis represents the radar movement direction candidate θs, and the vertical axis represents the radar movement velocity candidate Vs.

As illustrated in FIG. 12, a ballot box 540 is configured with (M×N) state candidates that are obtained by dividing the range of possible values of the radar movement direction θsd of the radar device 411 into M sections and dividing the range of possible values of the radar movement velocity Vsd of the radar device 411 into N sections.

That is, the ballot box 540 may set evaluation values of the state candidates that are a two-dimensional region by the radar movement direction candidates θs and radar movement velocity candidates Vs. The radar velocity candidate calculation unit 201 sequentially sets M radar movement direction candidates θs as the radar movement direction candidates θs for the vote.

The numbers M and N may be set in accordance with the estimation accuracy that is desired for the movement velocity and movement direction of the vehicle. For example, the voting unit 202 increases M and N in a case where higher estimation accuracy is desired. Further, each of the state candidates has an evaluation value, which is initialized to zero.

In ST3003 in FIG. 11, the radar velocity candidate calculation unit 201 calculates the radar movement velocity candidates Vs in accordance with the equation (2) by using the Doppler velocities V and directions θ for the samples and the radar movement direction candidates θs for the vote that are set in ST3002. The radar velocity candidate calculation unit 201 sets the calculated radar movement velocity candidates Vs as the radar movement velocity candidates Vs for the vote and outputs those with the radar movement direction candidates θs for the vote to the voting unit 202.

In ST3004, the voting unit 202 casts votes to boxes (state candidates) that correspond to the radar movement velocity candidates Vs for the vote and the radar movement direction candidates θs for the vote, which are calculated in ST3003.

Accordingly, the voting unit 202 casts votes to plural state candidates with respect to each of the stationary object samples of the reflected wave signals and sets the evaluation values of the state candidates. In order to set the evaluation value, one sample as one vote may be added to an original evaluation value, or the sample that is weighted by the reflection intensity as a weight may be added to the original evaluation value. However, in a case of casting the vote by the same sample, the voting unit 202 casts the votes with the same value to different state candidates.

Figure 13:
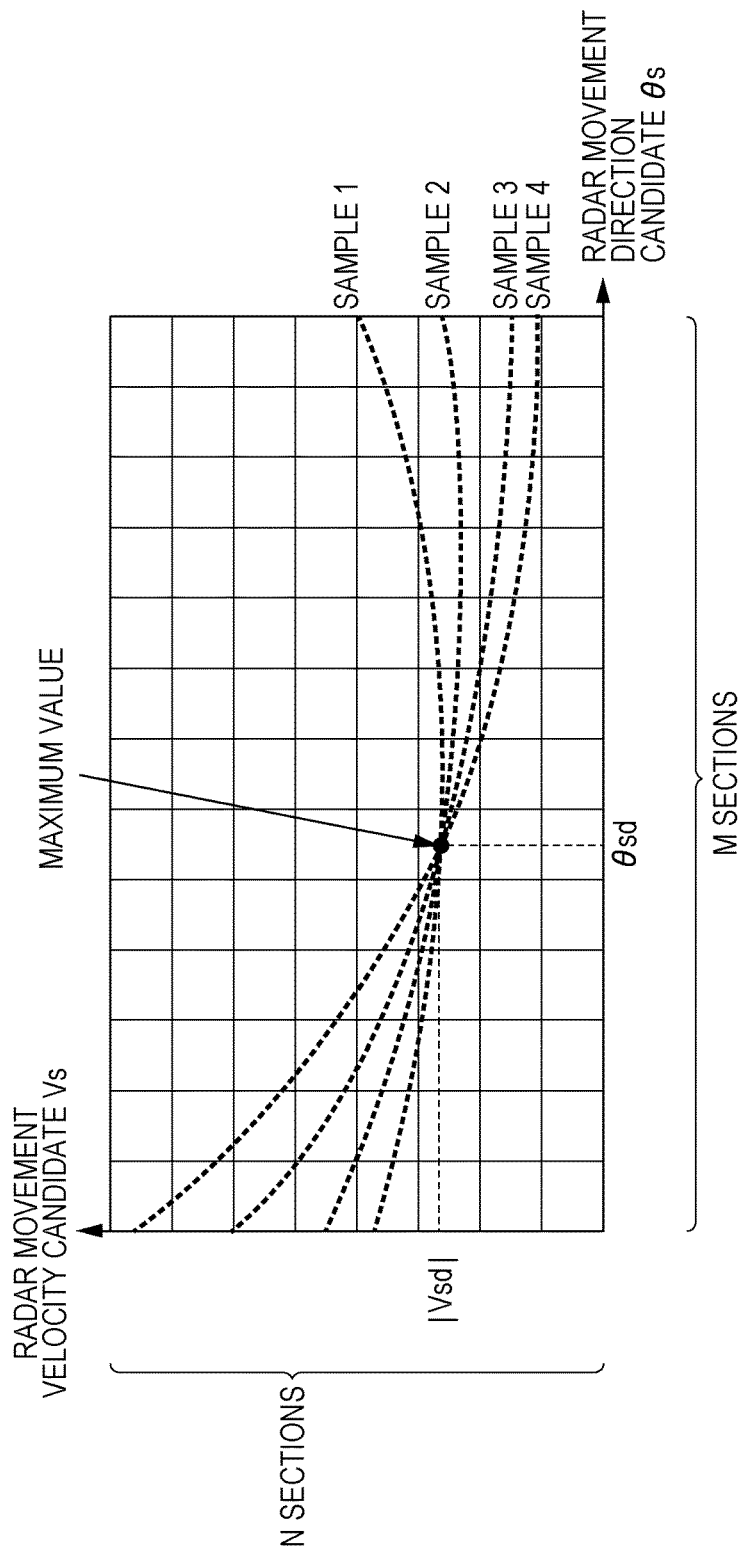
FIG. 13 illustrates one example of a voting process in which reflection intensities are accumulated as an evaluation value of a candidate state, at which the samples overlap with each other, in the first embodiment.

FIG. 13 is a diagram that illustrates one example of the voting process in which the samples overlap with each other at the state candidate θsd, Vsd and the reflection intensities are integrated for the evaluation value of the state candidate θsd, Vsd.

As described above, the voting unit 202 in advance sets the state candidate to vote by using the radar movement direction candidates θs for the vote and the radar movement velocity candidates Vs for the vote of the samples, as a ballot box.

For example, the radar movement direction candidate θs for the vote is set for each 1° interval in the range of −45° to +45°, and the number of possible values is M=91 sections. Further, as for the radar movement velocity candidate Vs for the vote, the range of possible values are demarcated into N=100 sections for each prescribed interval (for example, 0.5 km/h). As the state candidates, 9100 (M×N=91×100) state candidates are set. The setting of a voting region is not limited to the above, and the voting unit 202 may appropriately set the voting region in accordance with desired estimation accuracy.

The voting unit 202 adds (integrates) the reflection intensities of vote samples as the evaluation values of the state candidates at each time when the vote is casted to the state candidates that correspond to the radar movement direction candidates θs for the vote, which are set in ST3002, and the radar movement velocity candidates Vs for the vote, which are calculated in ST3003.

The radar state estimation unit 20 processes ST3002 to ST3004 for all possible directions of the radar movement direction candidate θs for the vote with respect to each of the samples. Further, the radar state estimation unit 20 processes ST3002 to ST3005 for the prescribed number of samples.

The sample with the larger reflection intensity among the prescribed number of samples has the larger influence in the vote. That is, the reflection intensities of the samples are used as weight coefficients in the voting process in the voting unit 202.

The reflection intensity is used as the weight of one vote in the vote. However, the number of samples may simply be added while the weight is set to one, or another weight may be used.

After the voting process for all the directions for all the samples is finished (Yes in ST3005 and ST3006), the radar state estimation unit 20 progresses to a process of ST3007.

In ST3007, the determination unit 203 extracts the state candidate with the maximum evaluation value (the total value of the reflection intensities) from the plural state candidates. The determination unit 203 then determines the radar movement velocity candidate Vs and radar movement direction candidate θs that correspond to the extracted state candidate as the true present radar movement velocity Vsd and radar movement direction θsd (the true present movement state of the radar device 411).

That is, the state candidate with the maximum value in FIG. 13 satisfies the relationship (the equation (2)) among the direction θ and Doppler velocity V of the reflected wave signal of many stationary objects, the radar movement direction candidate θs, and the radar movement velocity candidate Vs. Thus, the vehicle movement estimation device 400 may calculate the true radar movement direction θsd and the true radar movement velocity Vsd in a case where many of the plural reflected wave signals are the reflected wave signals from stationary objects.

In FIG. 13, it is understood that the distribution of the samples is concentrated around the state candidate that corresponds to the actual movement direction and velocity (the state candidate with the maximum value: the radar movement direction θsd and radar movement velocity Vsd). On the other hand, the distribution of the samples is dispersed in the state candidates separated from the state candidate that corresponds to the actual movement direction and velocity.

That is, as a result of the vote (plotting) with plural samples (reflected wave signals) in the radar state estimation unit 20, the reflection intensities (votes) of more samples are provided to the state candidates that correspond to the values around the actual movement direction and velocity (the radar movement direction θsd and radar movement velocity Vsd).

Thus, the state candidate that is more approximate to the actual radar movement direction θsd and radar movement velocity Vsd of the vehicle has the larger total value of the provided reflection intensities. Accordingly, the radar state estimation unit 20 determines the candidate among plural state candidates, for which the total value of the provided reflection intensities becomes the maximum, as the true present radar movement direction θsd and true present radar movement velocity Vsd of the radar.

As described above, in FIG. 13, the radar movement velocity candidates Vs that are calculated for plural samples become similar in the actual radar movement direction θsd. However, in directions separated from the actual radar movement direction θsd, the values of the calculated radar movement velocity candidate Vs become different in accordance with the samples. Thus, it is difficult to estimate the state of the vehicle in a case where the radar movement direction θsd and radar movement velocity Vsd of the vehicle is obtained with a single sample.

As described above, the vehicle movement estimation device 400 analyzes the reflected wave signals from plural stationary objects and may thereby estimate the radar movement velocity Vsd and radar movement direction θsd of one radar device 411 or each of plural radar devices 411 with high accuracy.

<Estimation of Movement of Vehicle by Using Rotational Angular Velocity>

In a case where the vehicle slips, as described above, it is difficult to estimate the vehicle movement velocity V' and vehicle movement direction α' from one radar movement velocity Vsd, one radar movement direction θsd, and the arrangement information.

FIGS. 14A and 14B are diagrams that illustrate one example of the difference in the circumstance of movement of the vehicle between a case where the vehicle does not slip and a case where the vehicle slips. FIG. 14A illustrates one example of a state where the vehicle is not slipping, and FIG. 14B illustrates one example of a state where the vehicle slips due to a road surface freezing.

As illustrated in FIG. 14A, it is assumed that the vehicle 511 steers the front wheels to the left at a time T0 and steers the front wheels to the right at a following time T1. As illustrated in FIG. 14A, in a case of not slipping, the movement direction of the vehicle (here indicated by the movement direction of the position of the radar device 411) turns in the direction in which the front wheels are directed. In a case of FIG. 14A, the radar movement velocity Vsd and radar movement direction θsd, which are obtained by the voting process based on the equation (2), correspond with the vehicle movement velocity V' and vehicle movement direction α'.

On the other hand, for example, in a case where a slip occurs after the time T0, as illustrated in FIG. 14B, the movement direction of the vehicle 511 is influenced by the inertia at the time when the front wheels are turned to the left between the time T0 and time T1, and the vehicle 511 rotates to the left and moves in the movement direction at the time T0. In a case of FIG. 14B, the radar movement velocity Vsd or radar movement direction θsd, which is obtained by the voting process based on the equation (2), does not correspond with the true vehicle movement velocity V' or true vehicle movement direction α'. The vehicle movement estimation device 400 takes the angular velocity of the rotation into account and further estimates the vehicle movement velocity V' and vehicle movement direction α'.

Figure 15:
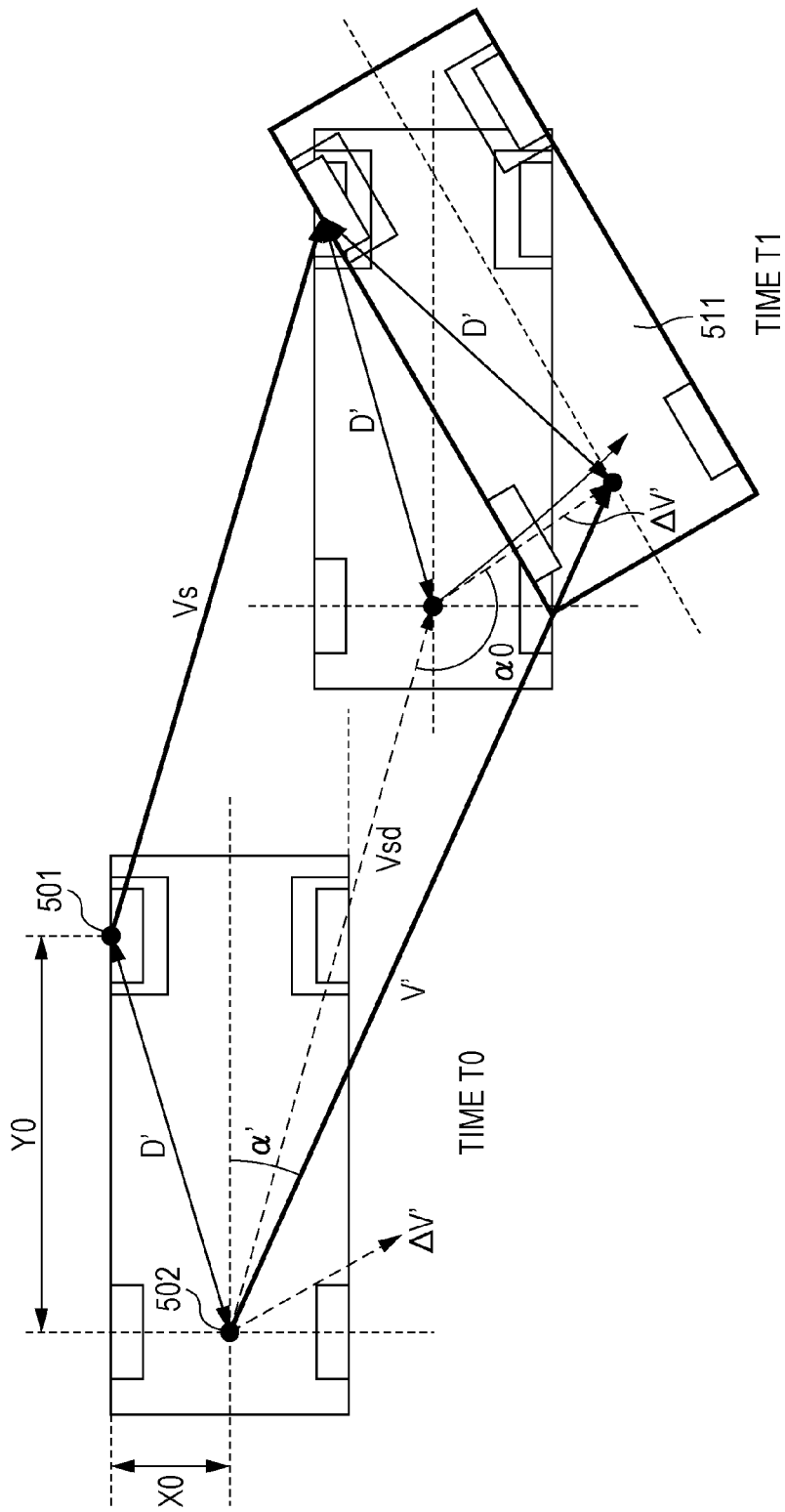
FIG. 15 explains an estimation scheme of a movement circumstance of the vehicle in the first embodiment.

FIG. 15 is a diagram for explaining a scheme for estimating the vehicle movement velocity V' and vehicle movement direction α' by using the rotational angular velocity ω of the vehicle 511.

As illustrated in FIG. 15, the interval between the vehicle reference point 502 and the radar position 501 will be represented as D', and the velocity of rotary motion of the vehicle reference point 502 will be represented as ΔV'.

The rotational angular velocity ω of the vehicle 511 is the same in an arbitrary point in the vehicle 511, which includes the vehicle reference point 502. Accordingly, a rotational velocity ΔV' may be calculated by the following equation (3), for example.

$$\Delta V' = \omega \times D' \quad (3)$$

The rotational angular velocity ω desired for obtainment of the rotational velocity ΔV' by the equation (3) may be acquired by a gyroscope. Alternatively, as for the rotational angular velocity ω, the rotational angular velocity ω of the vehicle is calculated based on the radar movement velocities and directions of the two radar devices 411 installed in different positions in the vehicle 511 in the road surface parallel plane and the installation information of the two radar devices 411. A specific calculation method will be described later.

Further, as illustrated in FIG. 15, a velocity vector due to shift movement of the vehicle reference point 502 is the same as a movement velocity vector of the radar device 411 and will be represented as Vsd. In addition, the angle between the velocity vector Vsd of the shift movement of the vehicle reference point 502 and a velocity vector ΔV' of rotary movement will be represented as α0.

Here, the distance between the radar device 411 and the vehicle reference point 502 in the vehicle width direction will be represented as X0, and the distance between the radar device 411 and the vehicle reference point 502 in the vehicle longitudinal direction will be represented as Y0. In this case, the angle α0 may be calculated by the following equation (4), for example, by using the angle β of the radar front direction 514 of the radar device 411 with respect to the vehicle front direction 513 and the radar movement direction θsd.

$$\alpha 0 = \frac{\pi}{2} + (\theta sd - \beta) + \tan^{-1}\frac{X0}{Y0} \quad (4)$$

The magnitude |V'| of a movement velocity vector V' of the vehicle reference point 502 may be calculated by the following equation (5) by using the magnitude |Vsd| of a radar movement velocity vector.

$$|V'|^2 = |\Delta V'|^2 + |Vsd|^2 - 2*|\Delta V'|*|Vsd|*\cos(\alpha 0) \quad (5)$$

Further, a movement direction α' of the vehicle reference point 502 (that is, the vehicle movement direction α') may be calculated by the following equation (6), for example.

$$\alpha' = (\theta sd - \beta) + \cos^{-1}\left\{\frac{|V'|^2 + |Vsd|^2 - |\Delta V'|^2}{2*|V'|*|Vsd|}\right\} \quad (6)$$

The vehicle movement estimation unit 450 uses the equations (3) to (6) to calculate the magnitude |V'| of the vehicle movement velocity and the vehicle movement direction α' from the magnitude |Vsd| of the radar movement velocity, the radar movement direction θsd, the rotational angular velocity ω of the vehicle 511, and the arrangement information (D', β, X0, and Y0).

Such an operation enables the vehicle movement estimation device 400 to estimate the radar movement velocity and radar movement direction of the radar device 411 arranged in the vehicle and the rotational angular velocity of the vehicle. Further, the vehicle movement estimation device 400 may estimate the vehicle movement velocity and vehicle movement direction based on the spatial relationship between the radar device 411 and the vehicle reference point, and the estimated radar movement velocity and radar movement direction, and the estimated rotational angular velocity.

<Effects of This Embodiment>

As described above, the vehicle movement estimation device 400 according to this embodiment performs transmission of the radar waves and reception of the reflected waves in the radar unit 410 arranged in the vehicle and estimates the radar movement velocity and radar movement direction of the radar unit 410 based on the received reflected waves. Further, the vehicle movement estimation device 400 estimates the rotational angular velocity of the vehicle and estimates the movement velocity and movement direction of a prescribed position of the vehicle based on the estimated radar movement velocity and radar movement direction, the estimated rotational angular velocity, and the spatial relationship between the radar unit 410 and the prescribed position of the vehicle.

Accordingly, the vehicle movement estimation device 400 according to this embodiment may more robustly and highly accurately estimate the movement velocity and movement direction of the vehicle.

In a case where the vehicle is slipping, it is difficult to accurately calculate the movement velocity of the vehicle from rotation information of tires. In this point, the vehicle movement estimation device 400 according to this embodiment does not use the rotation information of the tires and thus may more highly accurately estimate the vehicle movement velocity in a case where the vehicle is slipping.

In addition, in this embodiment, the vehicle movement estimation device 400 uses the reflected wave signals for the radar transmission signals and may thus estimate the movement velocity and movement direction of the vehicle while reducing the influence of measurement errors of a vehicle velocity sensor that depends on a situation of the vehicle and a moving situation of the vehicle, for example.

Further, in this embodiment, the vehicle movement estimation device 400 may highly accurately estimate the velocity and movement direction of the vehicle in either case where the vehicle moves straight or turns in a curve.

<Modification Examples of this Embodiment>

The position and orientation of the radar device 411 are not limited to the above-described example. For example, in a case where the radar device 411 is also used for another function such as periphery monitoring, the radar device 411 may be arranged in a position and orientation for providing the other function.

Further, the same antenna may be used as the transmit antenna 15 and the receive antenna 16. That is, the radar unit 410 may switch states of connection of the radar transmission unit 12 and the radar reception unit 17 with the antenna between a transmission interval of the radar wave and a reception interval of the reflected wave.

(Second Embodiment)

A second embodiment of the present disclosure is a specific example of a case where estimation results of the radar movement velocities and radar movement directions of two radar devices are used to estimate the rotational angular velocity of the vehicle in the vehicle movement estimation device according to the first embodiment.

<Arrangement of Radar Devices>

Figure 16:
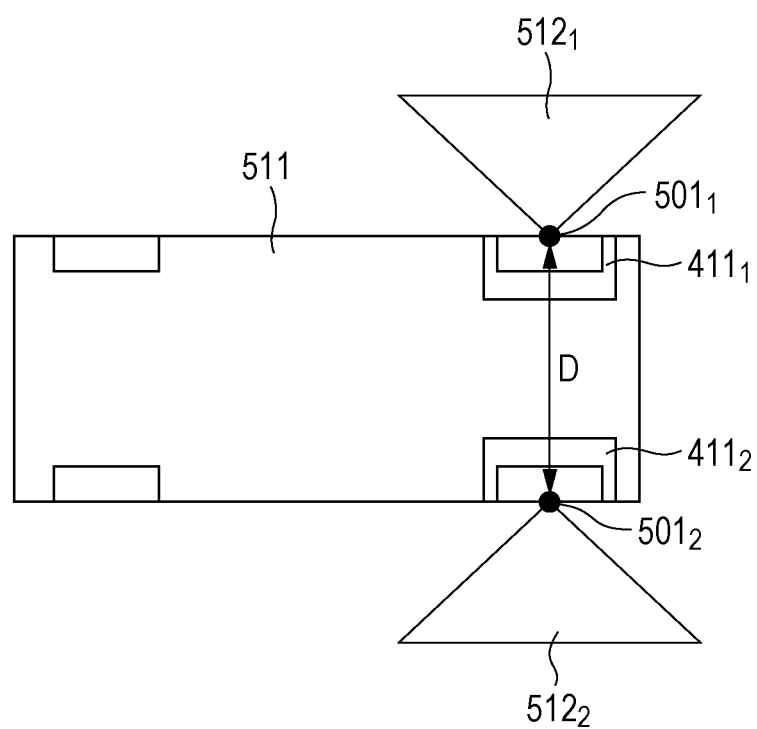
FIG. 16 illustrates one example of arrangement of two radar devices in a second embodiment of the present disclosure.

FIG. 16 is a diagram that illustrates one example of arrangement of the two radar devices and corresponds to FIG. 9 of the first embodiment.

As illustrated in FIG. 16, in a vehicle movement estimation device according to this embodiment, a first radar device $411_1$ and a second radar device $411_2$ are separately arranged at a distance (radar-to-radar distance) D.

The first radar device $411_1$ is arranged on a vehicle side portion in the vicinity of the left front wheel of the vehicle 511 such that a radar viewing angle $512_1$ is directed toward the left side of the vehicle 511. A radar position $501_1$ of the first radar device $411_1$ will hereinafter be referred to as "first radar position".

Further, the second radar device $411_2$ is arranged on a vehicle side portion in the vicinity of the right front wheel of the vehicle 511 such that a radar viewing angle $512_2$ is directed toward the right side of the vehicle 511. A radar position $501_2$ of the second radar device $411_2$ will hereinafter be referred to as "second radar position".

<Configuration of Vehicle Movement Estimation Device>

Figure 17:
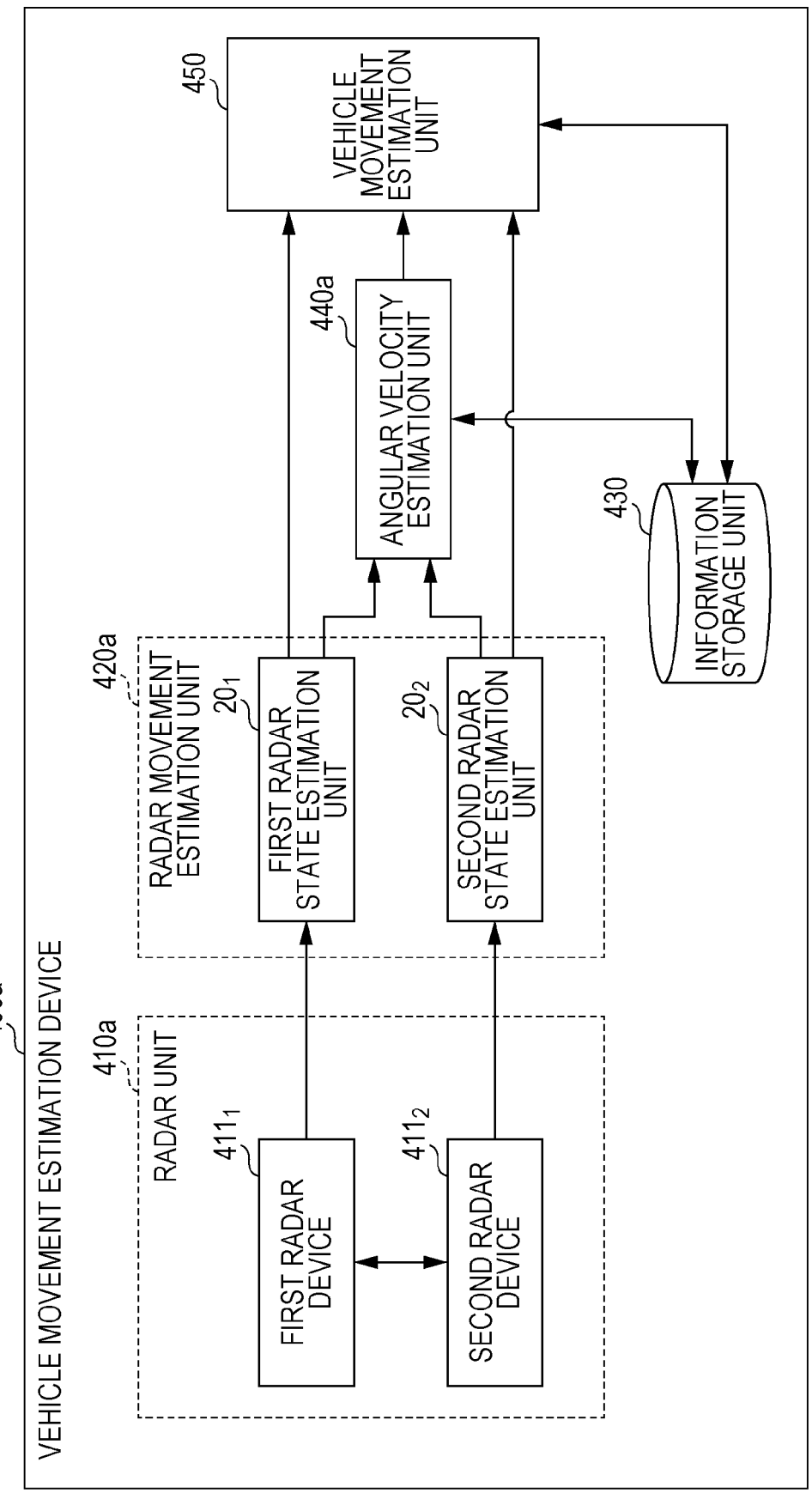
FIG. 17 illustrates one example of a configuration of a vehicle movement estimation device according to the second embodiment.

FIG. 17 is a block diagram that illustrates one example of a configuration of the vehicle movement estimation device according to this embodiment and corresponds to FIG. 1 of the first embodiment. The same portions as FIG. 1 are provided with the same reference numerals, and descriptions thereof will not be made.

As illustrated in FIG. 17, a vehicle movement estimation device 400a according to this embodiment has the first and second radar devices $411_1$ and $411_2$ in a radar unit 410a and has first and second radar state estimation units $20_1$ and $20_2$ in a radar movement estimation unit 420a. Further, the vehicle movement estimation device 400a has an angular velocity estimation unit 440a and is configured such that information output by the first and second radar state estimation units $20_1$ and $20_2$ is input to the angular velocity estimation unit 440a.

Each of the first and second radar devices $411_1$ and $411_2$ has the same configuration as the radar device 411, which is described in the first embodiment. Each of the first and second radar state estimation units $20_1$ and $20_2$ has the same configuration as the radar state estimation unit 20, which is described in the first embodiment.

That is, the vehicle movement estimation device 400a estimates the radar movement velocity and radar movement direction of the first radar position $501_1$ by the first radar device $411_1$ and the first radar state estimation unit $20_1$. The radar movement velocity and radar movement direction will hereinafter be referred to as "first radar movement velocity" and "first radar movement direction".

The vehicle movement estimation device 400a estimates the radar movement velocity and radar movement direction of the second radar position $501_2$ by the second radar device $411_2$ and the second radar state estimation unit $20_2$. The radar movement velocity and radar movement direction will hereinafter be referred to as "second radar movement velocity" and "second radar movement direction".

The angular velocity estimation unit 440a estimates the rotational angular velocity ω of the vehicle based on the first radar movement velocity and second radar movement velocity.

<Estimation Scheme of Rotational Angular Velocity>

An estimation scheme of the rotational angular velocity ω by the angular velocity estimation unit 440a will be described below.

Figure 18:
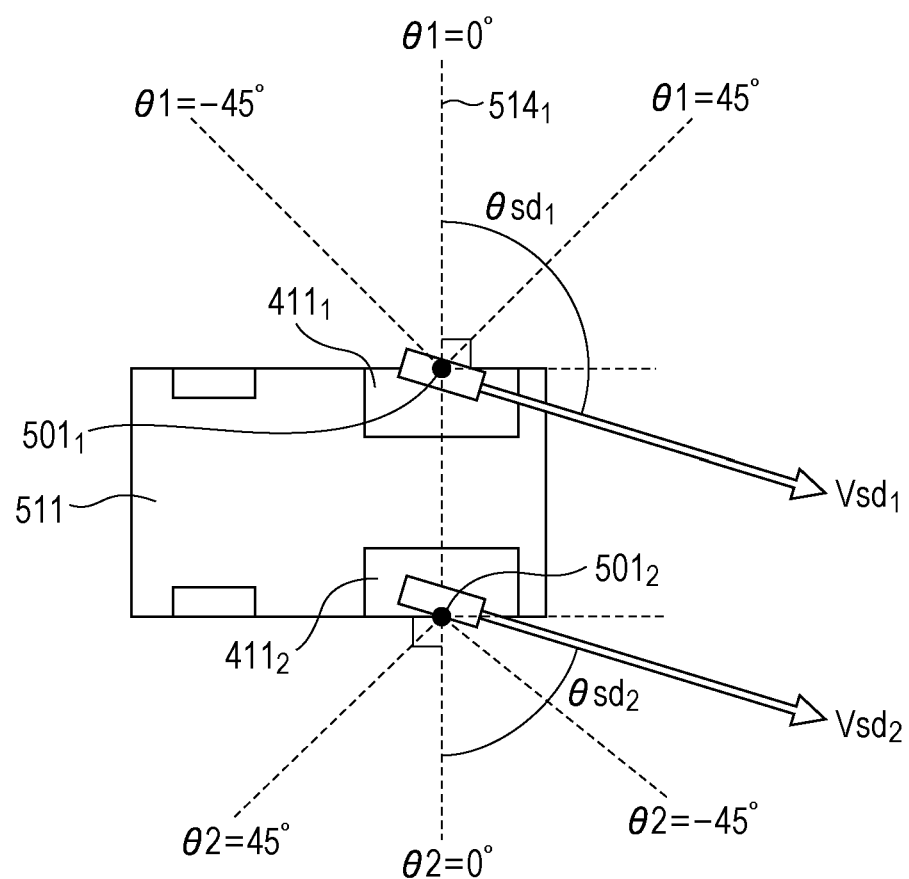
FIG. 18 explains various parameters in the second embodiment.

FIG. 18 is a diagram for explaining the first radar movement velocity, first radar movement direction, second radar movement velocity, and second radar movement direction.

As illustrated in FIG. 18, a first radar movement velocity $|Vsd_1|$ is the movement velocity of the first radar device $411_1$ (the first radar position $501_1$). A first radar movement direction $\theta sd_1$ is the angle of the movement direction with respect to a radar front direction (the center direction of the radar viewing angle and the left direction of the vehicle 511) $514_1$ of the first radar device $411_1$. In the description made below, a movement velocity vector of the first radar device $411_1$ (that is, the movement velocity and movement direction) will appropriately be referred to as "first radar movement velocity vector $Vsd_1$".

Further, a second radar movement velocity $|Vsd_2|$ is the movement velocity of the second radar device $411_2$ (the second radar position $501_2$). A second radar movement direction $\theta sd_2$ is the angle of the movement direction with respect to the radar front direction (the center direction of the radar viewing angle and the right direction of the vehicle 511) 514₂ of the second radar device 411₂. Further, in the description made below, a movement velocity vector of the second radar device 411₂ will appropriately be referred to as "second radar movement velocity vector Vsd₂". The angle of the radar movement direction is indicated by the radar coordinate system, becomes a negative value on the left side of the radar front direction, and becomes a positive value on the right side of the radar front direction, for example. In a case of FIG. 18, θsd₁ is a positive value, and θsd₂ is a negative value, for example.

The first radar movement direction θsd₁, the magnitude |Vsd₁| of the first radar movement velocity, the second radar movement direction θsd₂, and the magnitude |Vsd₂| of the second radar movement velocity are obtained in the radar unit 410a by the scheme described in the first embodiment, for example.

In a case where the vehicle 511 is not in rotary motion, the first radar movement velocity vector Vsd₁ almost matches the second radar movement velocity vector Vsd₂. However, in a case where the vehicle 511 is in rotary motion (particularly, in a case of rotation due to a slip), the first radar movement velocity vector Vsd₁ differs from the second radar movement velocity vector Vsd₂.

Here, the rotary motion between the first radar device 411₁ and the second radar device 411₂ will be focused. The rotary motion applied to the radar device 411 is derived from the rotary motion of the vehicle 511.

Figure 19:
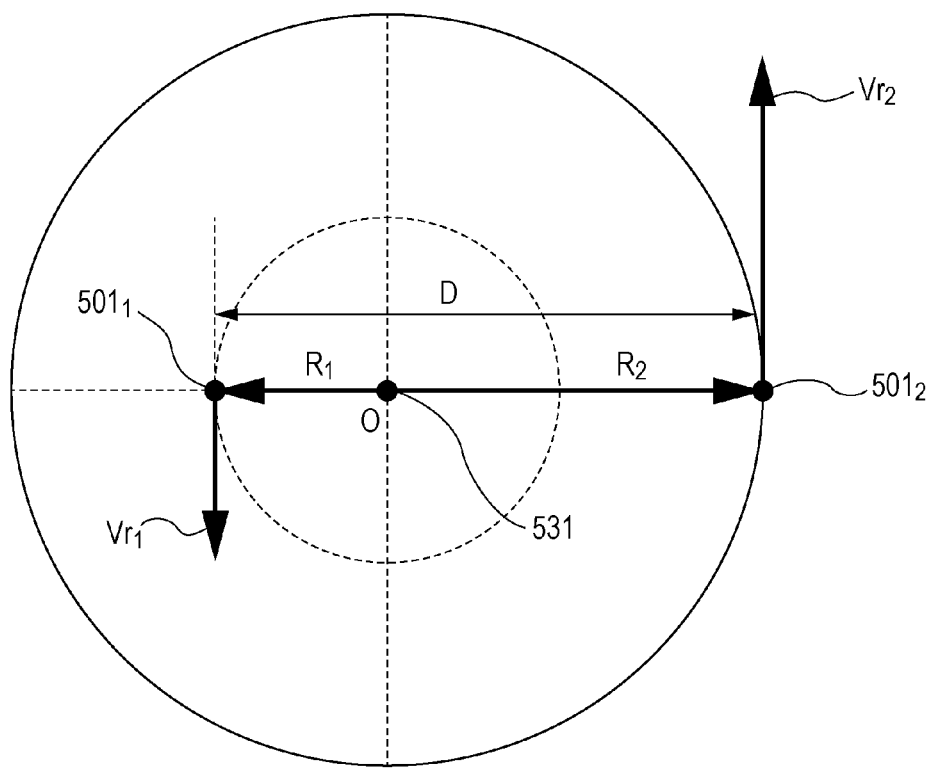
FIG. 19 illustrates one example of rotary motion between a first radar device and a second radar device in the second embodiment.

FIG. 19 is a diagram that illustrates one example of the rotary motion between the first radar device 411₁ and the second radar device 411₂, which is caused by the rotary motion of the vehicle 511.

A rotational center (hereinafter referred to as "radar rotational center") 531 is present in the rotary motion between the first radar device 411₁ (the first radar position 501₁) and the second radar device 411₂ (the second radar position 501₂). Here, a shift movement velocity vector (hereinafter referred to as "shift movement velocity vector") of the vehicle 511 will be represented by $V_{shift}$. Rotational velocity vectors Vr₁ and Vr₂ of the first radar device 411₁ and the second radar device 411₂ with respect to the radar rotational center 531 are expressed by the following equations (7) and (8), respectively.

$$Vr_1 = Vsd_1 - V_{shift} \tag{7}$$

$$Vr_2 = Vsd_2 - V_{shift} \tag{8}$$

The sum of a distance |R₁| from the radar rotational center 531 to the first radar device 411₁ and a distance |R₂| from the radar rotational center 531 to the second radar device 411₂ is equivalent to the radar-to-radar distance D (see FIG. 16). Note that |R₁|+|R₂|=|R₁−R₂|=D holds.

The direction of the rotational velocity vector Vr₁ of the first radar device 411₁ and the direction of the rotational velocity vector Vr₂ of the second radar device 411₂ are opposite from each other. Further, in a case where the radar rotational center 531 is not the middle point between the first radar position 501₁ and the second radar position 501₂, the magnitudes of the rotational velocity vectors Vr₁ and Vr₂ are different.

Meanwhile, the rotational angular velocity of the first radar device 411₁ with respect to the radar rotational center 531 matches the rotational angular velocity of the second radar device 411₂ with respect to the radar rotational center 531.

Accordingly, the rotational velocity vector Vr₁ of the first radar device 411₁ and the rotational velocity vector Vr₂ of the second radar device 411₂ may be expressed by the following equations (9) and (10), for example.

$$|Vr_1| = |\omega| \times |R_1| \tag{9}$$

$$|Vr_2| = |\omega| \times (D - |R_1|) \tag{10}$$

Then, the following equation (11) holds true based on the equations (9) and (10).

$$|Vr_1| + |Vr_2| = \omega \times D \tag{11}$$

In addition, because the rotational velocity vector Vr₁ of the first radar device 411₁ and the rotational velocity vector Vr₂ of the second radar device 411₂ are in the opposite directions, the equation (11) may be modified to the following equations (12).

$$\begin{aligned}|\omega| &= |Vr_1| + |Vr_2|/D \\ &= |Vr_1 - Vr_2|/D \\ &= |(Vsd_1 - V_{shift}) - (Vsd_2 - V_{shift})|/D \\ &= |Vsd_1 - Vsd_2|/D \end{aligned} \tag{12}$$

The first radar movement velocity vector Vsd₁ (that is, the movement velocity and movement direction) and the second radar movement velocity vector Vsd₂ (that is, the movement velocity and movement direction) are estimated by the radar movement estimation unit 420a as described above. Further, the radar-to-radar distance D is contained in the arrangement information stored in the information storage unit 430. Accordingly, the angular velocity estimation unit 440a calculates the rotational angular velocity ω with respect to the radar rotational center 531 of the first radar position 501₁ based on those pieces of known information and by using the equation (12).

The vehicle 511 is a rigid body, and the first and second radar devices 411₁ and 411₂ are fixed to the vehicle 511. Accordingly, even if any position of the vehicle 511 is assumed as the rotational center, the rotational angular velocity of the first radar position 501₁ and the rotational angular velocity of the second radar position 501₂ are the same.

As described above, the angular velocity estimation unit 440a estimates the rotational angular velocity ω based on the first radar movement velocity vector Vsd₁ and second radar movement velocity vector Vsd₂.

Here, a description will be made with specific examples of a movement state of the vehicle.

Figure 20:
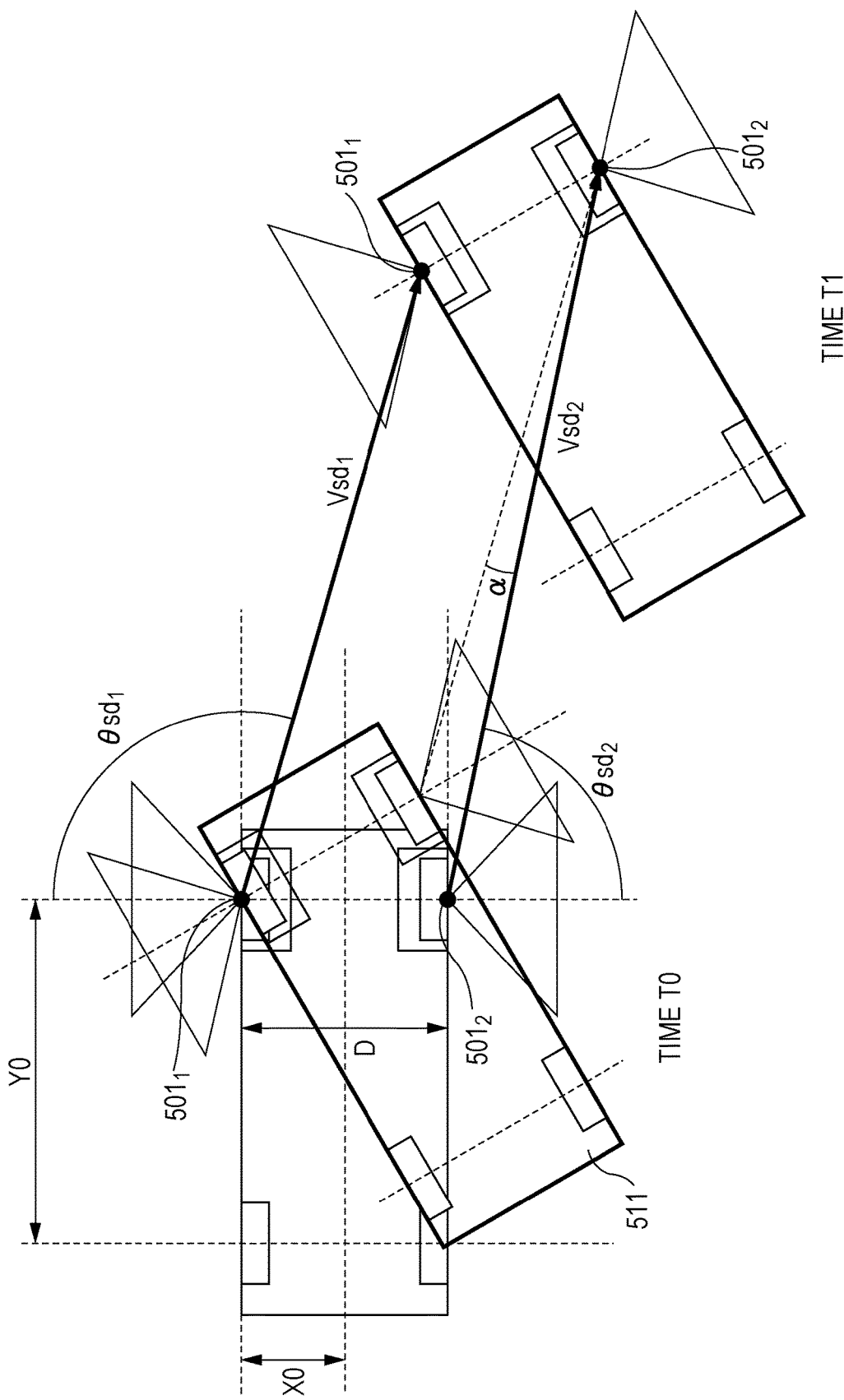
FIG. 20 illustrates one example of a circumstance in which the vehicle rotates in the second embodiment.
Figure 21:
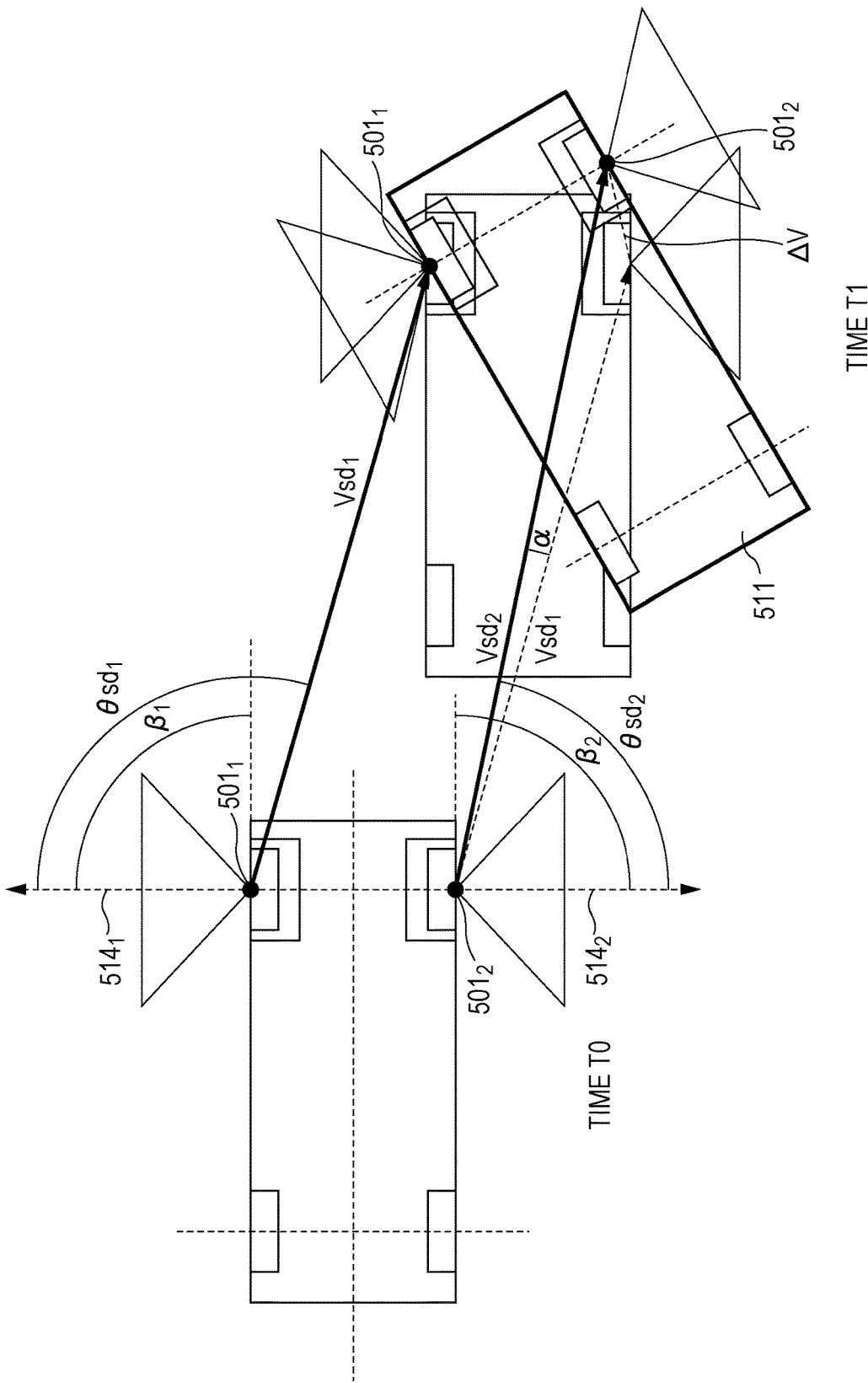
FIG. 21 illustrates one example of the circumstance in which the vehicle rotates in the second embodiment.

FIGS. 20 and 21 are diagrams that illustrate one example of a circumstance in which the vehicle slips and rotates.

As illustrated in FIGS. 20 and 21, the movement of the vehicle 511 from a time T0 to a time T1 may be resolved into two kinds of movement that are a shift and rotation.

In FIG. 20, the rotation of the vehicle is drawn with the first radar position 501₁ at the time T0 being a reference. In FIG. 21, the rotation of the vehicle is drawn with the first radar position 501₁ at the time T1 being the reference. However, FIGS. 20 and 21 illustrate the same movement action.

As described above, the radar movement estimation unit 420a estimates the first radar movement velocity vector Vsd₁ (the first radar movement direction θsd₁ and the magnitude |Vsd₁| of the first radar movement velocity vector) and the second radar movement velocity vector Vsd₂ (the second radar movement direction θsd₂ and the magnitude |Vsd₂| of the second radar movement velocity vector).

The radar-to-radar distance D is known. Here, in the vehicle coordinate system, the angle of the vehicle front direction 513 (see FIG. 9) with respect to the radar front direction $514_1$ of the first radar device $411_1$ ($\theta 1 = 0°$ in the radar coordinate system of the first radar device $411_1$) is set as $\beta_1$. Further, in the vehicle coordinate system, the angle of the vehicle front direction 513 with respect to the center of the second radar device $411_2$ ($\theta 2 = 0°$ in the radar coordinate system of the second radar device $411_2$) is set as $\beta_2$.

As understood from FIGS. 20 and 21, the first radar movement direction $\theta sd_1$ is on the right side of the radar front direction of the radar device $411_1$ and is thus a positive value, and the second radar movement direction $\theta sd_2$ is on the left side of the radar front direction of the radar device $411_2$ and is thus a negative value. Further, the angle $\beta_1$ is a negative value because the radar front direction of the radar device $411_1$ is on the left side of the vehicle front direction. The angle $\beta_2$ is a positive value because the radar front direction of the radar device $411_2$ is on the right side of the vehicle front direction.

Based on the values of the angles, the angle a formed by the first radar movement velocity vector $Vsd_1$ and second radar movement velocity vector $Vsd_2$ is expressed by the following equation (13), for example.

$$\alpha = (\theta sd_1 + \beta_1) - (\theta sd_2 + \beta_2) \tag{13}$$
$$= (\theta sd_1 - \theta sd_2) + (\beta_1 - \beta_2)$$

The following equation (14) holds true about a velocity vector component $\Delta V$ of the rotation of the radar device $411_2$ that is caused by the rotation of the vehicle 511.

$$Vsd_1 + \Delta V = Vsd_2 \tag{14}$$

Further, the velocity vector component $\Delta V$ of the rotation of the radar device $411_2$ may be expressed by the following equation (15) based on the equation (14).

$$\Delta V = Vsd_2 - Vsd \tag{15}$$

Then, the following equation (16) is derived from the equations (12) and (15).

$$|\omega| = |Vsd_1 - Vsd_2|/D \tag{16}$$
$$= |\Delta V|/D$$

The term $|\Delta V|$ in the equation (16) may be obtained by the law of cosines and by the following equation (17).

$$|\Delta V| = |Vsd_1|^2 + |Vsd_2|^2 - 2 \times |Vsd_1| \times |Vsd_2| \times \cos \alpha \tag{17}$$

The rotary motion of the vehicle is counter-clockwise in a case of $|Vsd_1| < |Vsd_2|$, and the rotary motion of the vehicle is clockwise in a case of $|Vsd_1| > |Vsd_2|$. Because the vehicle undergoes shift movement in the case of $|Vsd_1| = |Vsd_2|$, the rotational angular velocity of every position is zero.

The above-described equation (16) conforms with the above-described equation (12).

<Effects of this Embodiment>

As described above, the vehicle movement estimation device 400a according to this embodiment has the two radar devices 411 that are installed in different positions in the vehicle and estimates the radar movement velocity and radar movement direction of each of the two radar devices 411. Further, the vehicle movement estimation device 400a according to this embodiment estimates, by the angular velocity estimation unit 440a, the rotational angular velocity ω of the vehicle based on the estimated radar movement velocities and radar movement directions of the two radar devices 411 and the distance D between those radar devices 411 in the road surface parallel plane.

Accordingly, the vehicle movement estimation device 400a according to this embodiment may highly accurately estimate the rotational angular velocity w of the vehicle without using a gyroscope or the like.

In a case where the movement direction of the vehicle is estimated by measuring the angular velocity by using a gyroscope, the movement direction is calculated by successively integrating the measured angular velocity. However, in such an integrating process, in a case where an error such as gyro-drift is contained in a measurement value, the error is together integrated, and the estimation accuracy of the rotational angular velocity is impaired. Further, because the error in the measurement value of the gyroscope fluctuates at random in accordance with a lapse of time, temperature, and so forth, it is troublesome to correct such measurement errors with high accuracy. In addition, a large error occurs to the measurement value in a case where the road surface is inclined or uneven.

Accordingly, the vehicle movement estimation device 400a according to this embodiment may more highly accurately estimate the rotational angular velocity ω of the vehicle and may more highly accurately estimate the movement velocity and movement direction of the vehicle compared to related art. The vehicle movement estimation device 400a may robustly, continuously, and highly accurately estimate the movement of the vehicle particularly in a state where the vehicle is slipping and a state where the vehicle turns due to unevenness of the road surface.

<Modification Examples of this Embodiment>

The position and orientation of the two radar devices 411 are not limited to the above-described example. For example, in a case where many stationary objects are present on the left side of the road with respect to the moving direction of the vehicle in the countries of left-hand traffic (for example, Japan), both of the two radar devices 411 may be installed on a left portion of the vehicle to be directed leftward. Further, in a case where many stationary objects are present on the right side of the road with respect to the moving direction of the vehicle in the countries of right-hand traffic (for example, United States), both of the two radar devices 411 may be installed on a right portion of the vehicle to be directed rightward. Further, the radar-to-radar distance may be extended in view of improving the estimation accuracy of the rotational angular velocity ω.

Further, the number of the radar device 411 is not limited to the above-described example. For example, the vehicle movement estimation device 400a may measure the radar movement velocity Vsd and radar movement direction θsd of each of three or more radar devices 411. Further, the vehicle movement estimation device 400a may perform a portion of or whole the above-described process for each combination of two radar devices extracted from the three radar devices and may obtain an average of values obtained from each of the combinations.

(Modification Examples of the Embodiments)

Various embodiments have been described with reference to the drawings in the foregoing. However, the present disclosure is not limited to such embodiments. It is understood that a person having ordinary skill in the art may conceive various variations and modifications within the scope described in the claims and it is matter of course that those belong to the technical scope of the present disclosure. Further, elements in the above embodiments may be arbitrarily combined in the scope that does not depart from the gist of the present disclosure.

For example, in the above embodiments, a radar device is exemplified as a sensor for estimating the movement direction and movement velocity of a certain position of a vehicle. However, a sensor is not limited thereto. For example, an acceleration sensor may be employed.

Further, in the above embodiments, a gyroscope is exemplified as a sensor for estimating the rotational angular velocity of a vehicle, not based on the movement velocities in two certain positions of the vehicle. However, a sensor is not limited thereto. For example, a fiber optic gyroscope may be employed.

Further, the vehicle movement estimation device may estimate the movement velocity and movement direction of the radar device and the rotational angular velocity of the vehicle with respect to another plane than a plane that is parallel to a road surface (road surface parallel plane).

Further, targets whose movement velocity and movement direction are estimated by the vehicle movement estimation devices according to the above embodiments are not limited to various vehicles such as motorcycles, bicycles, and trucks but may be moving bodies such as self-walking robots other than vehicles.

Further, the above embodiments of the present disclosure may be configured only with hardware or may be realized by software in combination with hardware.

For example, function blocks used for the descriptions of the above embodiments may typically be realized as an LSI that is an integrated circuit. The integrated circuit may control the function blocks used for the descriptions of the above embodiments and include input and output portions. Those function blocks may be formed into individual chips or formed into one chip that includes a portion or all of those. Here, the integrated circuit is referred to as LSI. However, the integrated circuit may be referred to as IC, system LSI, super LSI, or ultra LSI in accordance with the difference in the degree of integration.

Further, a method of forming the integrated circuit is not limited to an LSI, but the integrated circuit may be realized as a dedicated circuit or a general purpose processor. A field programmable gate array (FPGA), which is programmable after manufacture of the LSI, or a reconfigurable processor, in which connection and settings of circuit cells in the LSI are reconfigurable, may be used.

In addition, in a case where a technique of forming an integrated circuit, which replaces the LSI, emerges from other techniques developed or derived from semiconductor technologies, it is matter of course that the function blocks may be integrated by using the technique. Application of biotechnology and so forth are possible.

CONCLUSION OF PRESENT DISCLOSURE

A vehicle movement estimation device of the present disclosure is a vehicle movement estimation device including: a radar that is arranged in a vehicle and that performs transmission of a radar wave and reception of a reflected wave that is the radar wave reflected by an object; a radar movement estimator that estimates a radar movement velocity and a radar movement direction of the radar based on the reflected wave; an angular velocity estimator that estimates a rotational angular velocity of the vehicle; and a vehicle movement estimator that estimates a movement velocity and a movement direction of a prescribed position of the vehicle based on the radar movement velocity, the radar movement direction, the rotational angular velocity, and a spatial relationship between the radar and the prescribed position.

In the vehicle movement estimation device, the radar may have two radar devices that are installed in different positions in the vehicle, the radar movement estimator may estimate the respective radar movement velocities and the respective radar movement directions of the two radar devices based on the respective reflected waves that are received by the two radar devices, and the angular velocity estimator may estimate the rotational angular velocity based on the respective radar movement velocities and the respective radar movement directions of the two radar devices and a distance between the two radar devices.

Further, the vehicle movement estimation device may further include an information storage unit that stores arrangement information which indicates relative positions of the two radar devices with respect to the prescribed position.

Further, in the vehicle movement estimation device, the two radar devices may be installed in different positions at least in a plane that is parallel to a road surface, the arrangement information may indicate the relative positions at least in the plane that is parallel to the road surface, the radar movement estimator may estimate the respective radar movement velocities and the respective radar movement directions of the two radar devices in the plane that is parallel to the road surface, and the angular velocity estimator may estimate the rotational angular velocity in the plane that is parallel to the road surface.

Further, in the vehicle movement estimation device, the prescribed position may be a position that corresponds with a middle point between a left rear wheel and a right rear wheel of the vehicle in the plane which is parallel to the road surface.

Further, in the vehicle movement estimation device, the two radar devices may include a first radar device and a second radar device, the first radar device may be installed in a left front portion of the vehicle, a viewing angle of the first radar device may include a portion on a left side of the vehicle, the second radar device may be installed in a right front portion of the vehicle, and a viewing angle of the second radar device may include a portion on a right side of the vehicle.

Further, in the vehicle movement estimation device, the two radar devices may be installed in a left portion of the vehicle, and viewing angles of the two radar devices may include a left direction of the vehicle, or the two radar devices may be installed in a right portion of the vehicle, and the viewing angles of the two radar devices may include a right direction of the vehicle.

Further, in the vehicle movement estimation device, the angular velocity estimator may include a gyroscope.

A vehicle movement estimation method of the present disclosure is a vehicle movement estimation method including: performing, by a radar that is arranged in a vehicle, transmission of a radar wave and reception of a reflected wave that is the radar wave reflected by an object; estimating a radar movement velocity and a radar movement direction of the radar based on the reflected wave; estimating a rotational angular velocity of the vehicle; and estimating a movement velocity and a movement direction of a prescribed position of the vehicle based on the radar movement velocity, the radar movement direction, the rotational angular velocity, and a spatial relationship between the radar and the prescribed position.

The present disclosure is useful as a vehicle movement estimation device and a vehicle movement estimation method that may more robustly and highly accurately estimate a movement velocity and a movement direction of a vehicle even in a case where the vehicle slips.

What is claimed is:

1. A vehicle movement estimation device comprising:
   two radar devices, which, in operation, transmit radar waves and receives reflected waves that are the radar waves reflected by objects, the two radar devices configured to be provided at different positions on a vehicle;
   a radar movement estimator, which, in operation, estimates respective radar movement velocities and respective radar movement directions of the two radar devices based on the reflected waves;
   an angular velocity estimator, which, in operation, estimates a rotational angular velocity of the vehicle based on the respective radar movement velocities and the respective radar movement directions of the two radar devices and a distance between the two radar devices; and
   a vehicle movement estimator, which, in operation, estimates a movement velocity and a movement direction of a prescribed position of the vehicle based on the respective radar movement, velocities, the respective radar movement directions, the rotational angular velocity, and spatial relationships between the two radar devices and the prescribed position.

2. The vehicle movement estimation device according to claim 1, further comprising:
   an information storage, which, in operation, stores arrangement information which indicates relative positions of the two radar devices with respect to the prescribed position.

3. The vehicle movement estimation device according to claim 1, wherein
   the two radar devices are provided in different positions which can be at least described in a plane that is parallel to a road surface,
   the arrangement information indicates the relative positions at least in the plane that is parallel to the road surface,
   the radar movement estimator estimates the respective radar movement velocities and the respective radar movement directions of the two radar devices in the plane that is parallel to the road surface, and
   the angular velocity estimator estimates the rotational angular velocity in the plane that is parallel to the road surface.

4. The vehicle movement estimation device according to claim 3, wherein the prescribed position is a position that corresponds with a middle point between a left rear wheel and a right rear wheel of the vehicle in the plane which is parallel to the road surface.

5. The vehicle movement estimation device according to claim 1, wherein
   the two radar devices include a first radar device and a second radar device,
   the first radar device is provided in a left front portion of the vehicle, and a viewing angle of the first radar device includes a portion on a left side of the vehicle,
   the second radar device is provided in a right front portion of the vehicle, and a viewing angle of the second radar device includes a portion on a right side of the vehicle.

6. The vehicle movement estimation device according to claim 1, wherein:
   the two radar devices are provided in a left portion of the vehicle, and viewing angles of the two radar devices include a left direction of the vehicle; or
   the two radar devices are provided in a right portion of the vehicle, and the viewing angles of the two radar devices include a right direction of the vehicle.

7. A vehicle movement estimation method comprising:
   performing, by two radar devices that are provided at different positions on a vehicle, transmissions of radar waves and receptions of reflected waves that are the radar waves reflected by objects;
   estimating respective radar movement velocities and respective radar movement directions of the two radar devices based on the reflected waves;
   estimating a rotational angular velocity of the vehicle based on the respective radar movement velocities and the respective radar movement directions of the two radar devices and a distance between the two radar devices; and
   estimating a movement velocity and a movement direction of a prescribed position of the vehicle based on the respective radar movement velocities, the respective radar movement directions, the rotational angular velocity, and spatial relationships between the two radar devices and the prescribed position.

* * * * *